United States Patent
Paine, Jr.

(10) Patent No.: US 7,192,644 B2
(45) Date of Patent: Mar. 20, 2007

(54) NON-AQUEOUS BORATE ROUTES TO BORON NITRIDE

(75) Inventor: Robert T. Paine, Jr., Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 11/186,787

(22) Filed: Jul. 22, 2005

(65) Prior Publication Data

US 2005/0281726 A1 Dec. 22, 2005

Related U.S. Application Data

(63) Continuation-in-part of application No. 10/280,456, filed on Oct. 24, 2002, which is a continuation-in-part of application No. 10/131,301, filed on Apr. 23, 2002, now Pat. No. 6,824,753.

(60) Provisional application No. 60/374,966, filed on Apr. 22, 2002.

(51) Int. Cl.
*C01B 21/064* (2006.01)
*C01B 21/082* (2006.01)

(52) U.S. Cl. ........................ 428/402; 423/277; 423/290

(58) Field of Classification Search .............. 423/277, 423/290; 428/402
See application file for complete search history.

(56) References Cited

U.S. PATENT DOCUMENTS

| | | |
|---|---|---|
| 2,629,732 A | 2/1953 | Schechter |
| 2,824,787 A | 2/1958 | May et al. |
| 3,352,637 A | 11/1967 | Heymer et al. |
| 3,711,594 A | 1/1973 | Bienert et al. |
| 4,744,831 A * | 5/1988 | Beck .......................... 106/409 |
| 4,784,978 A | 11/1988 | Ogasawara et al. |
| 4,971,779 A * | 11/1990 | Paine et al. .................. 423/290 |
| 6,348,179 B1 | 2/2002 | Paine et al. |
| 6,652,822 B2 | 11/2003 | Phillips et al. |

FOREIGN PATENT DOCUMENTS

| | | |
|---|---|---|
| DE | 2004360 | 8/1971 |
| DE | 1943581 | 3/1972 |
| DE | 1943582 | 3/1972 |
| EP | 0 396 448 | 11/1990 |
| JP | 60-200811 | 3/1984 |
| JP | 60 200811 | 10/1985 |

OTHER PUBLICATIONS

Bienert et al., Abstract of German Patent 1,943,581 as published in Industrial Inorganic Chemicals., vol. 74, No. 101255v (1971), no month.

(Continued)

*Primary Examiner*—Wayne A. Langel
(74) *Attorney, Agent, or Firm*—MH2 Technology Law Group

(57) ABSTRACT

A non-aqueous route and process for preparation of boron nitride utilizing aerosol assisted vapor phase synthesis (AAVS) wherein boron precursors are nitrided in one or two heating steps, and wherein a boron oxide nitride carbide intermediary composition is formed after the first heating step and may be further nitrided to form resultant spheroidal boron nitride powders including dense or hollow spheroidal particles that are smooth, bladed, dense or hollow, have protruding whiskers, and are of turbostratic or hexagonal crystalline structure, specifically wherein the boron precursor is dissolved in a non-aqueous solution prior to aerosolization.

10 Claims, 15 Drawing Sheets

OTHER PUBLICATIONS

Bienert et al., Abstract of German Patent 1,943,582 as published in Industrial Inorganic Chemicals, vol. 74, No. 101255w (1971), no month.

Bienert et al., Abstract of German Patent 2,004,360 as published in Industrial Inorganic Chemicals, vol. 75, No. 1029081 (1971), no month.

Goubeau et al., Anorg. Allgem. Chem., vol. 266, pp. 1561-280 (1951) with English translation, no month.

Lappert, Chem. Rev., vol. 56, pp. 959-975 and 1056-1064 (1956), no month.

Lindquist et al., "*Boron Nitride Powders Promed by Aerosol Decomposition of Poly (borazinylamine) Solutions*," J. Am. Ceram. Soc., vol. 74, No. 12 (1991), no month.

Murakawa et al., "*Boron Nitride Manufacture*," Jpn Kokai Tokkyo Koho Japanese Patent JP 60.2000.811 (Oct. 11, 1985).

Paine et al., "*Synthetic Routes to Boron Nitride*," Chem. Rev., vol. 90, pp. 73-01 (1990), no month.

Pruss et al., "*Aerosol Assissted Vapor Synthesis of Spherical Boron Nitride Powders*," Chemistry of Materials, vol. 12, No. 1, pp. 19-21 (2000), no month.

Steinberg, Organoboron Chemistry TEXTBOOK, J. Wiley and Sons, Ch. 4, pp. 124-125, 129, 191, 204-205, 212, no date.

Wade et al., "*Synthesis and Characterization of Processable Polyborate Precursors*," J. of Sol-Gel Sci and Tech., vol. 5, pp. 15-25 (1995), no month.

* cited by examiner

US 7,192,644 B2

NON-AQUEOUS BORATE ROUTES TO BORON NITRIDE

CROSS-REFERENCE TO RELATED APPLICATIONS

This application is a continuation-in-part application of U.S. application Ser. No. 10/280,456, entitled "Non-Aqueous Borate Routes to Boron Nitride," filed Oct. 24, 2002, which is a continuation-in-part application of U.S. patent application Ser. No. 10/131,301, entitled "Organoboron Route and Process for Preparation of Boron Nitride," filed Apr. 23, 2002 now U.S. Pat. No. 6,824,753, which claims the benefit of the filing of U.S. Provisional Patent Application Ser. No. 60/374,966, entitled "Non-Aqueous Borate Routes to Boron Nitride," filed on Apr. 22, 2002. Those applications are incorporated by reference in their entirety herein.

GOVERNMENT RIGHTS

The U.S. Government may have a paid-up license in portions of this invention and the right in limited circumstances to require the patent owner to license others on reasonable terms as provided for by the terms of Contract Nos. CHE9508668 and CHE9983205 awarded by the National Science Foundation.

COPYRIGHTED MATERIAL

A portion of the disclosure of this patent document and of the related application listed above contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention

The present teachings relate to boron nitride powders/particles and methods for its production. More particularly, the present teachings relate to boron nitride powders/particles comprised of dense or hollow primary particles exhibiting smooth spherical morphology, spheroidal particles with "bladed" surface morphology, spheroidal particles with protruding "whiskers," and fully "bladed" particles with platelet morphology, and particles having turbostratic or hexagonal crystal structure and methods for their production.

2. Background Art

Boron nitride (BN) is a commercially produced refractory non-oxide ceramic material whose properties are highly dependent on its crystalline structure. The most common structure for BN is a hexagonal crystal structure (h-BN). This structure is similar to the graphitic structure of carbon, and consists of extended two-dimensional layers of edge-fused six-membered $(BN)_3$ rings. The layers arrange so that B atoms in the rings in one layer are above and below N atoms in neighboring layers and vice versa (i.e., the rings are shifted positionally with respect to layers). The intraplanar B—N bonding within layers in the fused six-membered rings is strongly covalent while the interplanar B—N bonding is weak, similar to graphite. The layered, hexagonal crystal structure results in anisotropic physical properties that make this material unique in the overall collection of non-oxide ceramics.

From the commercial standpoint, h-BN is typically obtained as a powder, most often from multi-step processes employing boric oxide, sodium borate, or boric acid (as the boron raw material) and urea, melamine, and/or ammonia (as the nitriding source). In its powder form, BN can be processed by classical powder-forming methods into simple and complex shapes. Such powders are often hot-pressed in the fabrication of finished articles. Since it is soft, the hot pressed, processed bodies can be easily machined. BN is also obtained by chemical vapor deposition (CVD) growth, referred to as "pyrolytic" BN.

Pyrolytic BN is considered the most typical form of BN in the industry, given the absence of binders and improved crystallinity and grain features. As a result, unless otherwise indicated, properties of BN described in these background materials are representative of pyrolytic BN. Under standard solid state synthesis conditions, BN is typically obtained as a mixture of mesographitic and turbostratic modifications that contain varying degrees of disorder of the ideal hexagonal BN structure (h-BN). Fully ordered h-BN is only obtained with careful attention to synthetic detail. (Paine, R T, Narula, C K. Synthetic Routes to Boron Nitride. *Chem. Rev.* 90: 73–91, 1990.)

All of the syntheses are driven by the thermodynamic stability of BN (in the absence of oxygen and moisture, BN is stable above 2000° C. in $N_2$ and under reducing nitridation conditions that remove impurities). (Paine, R T, Narula, C K. Synthetic Routes to Boron Nitride. *Chem. Rev.* 90: 73–91 1990.) Carbothermal reduction conditions can also be employed to remove impurity oxygen. Commercial powder producers manipulate reaction conditions in order to achieve target powder purity, grain size, sinterability, and crystallinity. These features, in turn, influence powder processibility and finished product performance. It is important to note that commercial powders are usually obtained with primary particles having a platelet morphology, a macroscopic manifestation of the inherent crystal structure of h-BN, or as primary particle agglomerates having irregular morphology.

Commercial applications for h-BN are well established in several traditional ceramic markets. In particular, the high temperature stability, chemical inertness, lubricity, electrical resistivity and thermal conductivity make BN powders ideal for fabrication of products used in aerospace, automotive and microelectronic products, including large crucibles, heat sinks, mold liners and electrical insulators.

Recently, interest has arisen in inorganic ceramic/organic polymer composites containing BN powders for thermal management applications. It has been suggested in the art that a spherical morphology BN powder would be useful to enhance powder processing of polymers. However, a commercial source of such powders is not available. One known process to obtain small, laboratory-scale samples of spheroidal BN involves reacting trichloroborazine with an aminosilane to form a polymer, poly(borazinylamine), that dissolves in liquid ammonia ($NH_3$). The resulting solution is used to form an aerosol that is passed through a reaction furnace, producing a boron nitride powder composed of primary particles having spherical morphology. Further nitridation in an $NH_3$ atmosphere at a temperature of 1600° C., over a period of time of at least eight hours, gives h-BN particles of overall spheroidal shape with protruding non-uniform blades. This process is not commercially viable since it requires the use of an expensive, commercially unavailable polymer that is made only from an expensive commercially unavailable monomer. (Lindquist, D A et al.

Boron Nitride Powders Formed by Aerosol Decomposition of Poly(borazinylamine) Solutions. *J. Am. Ceram. Soc.* 74 (12) 3126–28, 1991.)

As another example, a second method reacts boron trichloride with ammonia, a combination typically used to make platelet morphology h-BN by CVD. The resulting powders are treated at high temperature in a graphite furnace under vacuum. (The patent suggests formation of spherical primary particles although no evidence of the actual morphology is provided.) This process, if successful, is not commercially attractive due to the expense of the starting material, $BCl_3$, and the formation of a corrosive by-product HCl that tends to leave chloride impurities in powders. (EPO No. 0 396 448)

A third and potentially more practical approach for the formation of spherical morphology h-BN powders utilizes a process where an aerosol is generated from a saturated (0.9M) aqueous solution of boric acid. The aerosol is passed into a heated tubular reactor where it is nitrided by $NH_3$ in a temperature range of between 600° C. and 1500° C., preferably between 1000° C. and 1200° C. A powder product, $BN_XO_Y$, is collected that contains significant amounts of oxygen, typically between 40 wt. % to 55 wt. %. The primary particles have spherical particle diameters in the range 0.1 micron to 5 microns. These powders are subsequently nitrided in a second stage in a temperature range of between 1000° C. to 1700° C. under a flowing stream of $NH_3$. The oxygen contents of the resulting boron nitride powders are less than 4 wt. % and the particles retain the spherical morphology. (Pruss et al., Aerosol Assisted Vapor Synthesis of Spherical Boron Nitride Powders. *Chem. Mater.* 12(1), 19–21, 2000; U.S. Pat. No. 6,348,179 to Pruss et al.)

Although the process described by Pruss et al. is practically useful for the production of spherical morphology BN powders, it possesses several drawbacks, including: (a) large amounts of water are injected into the tubular reaction zone in the form of aerosol droplets thereby diluting the $NH_3$ reactant that is required for nitridation of $H_3BO_3$ dissolved in the aqueous aerosol droplets; (b) the large amounts of injected water act as a back-reactant with $BN_XO_Y$ aerosol powders; (c) water is also formed as a reaction by-product in the first stage aerosol nitridation; (d) the $BN_XO_Y$ powders formed in the first-stage nitridation reaction contain large amounts of oxygen; (e) the large amounts of oxygen are difficult to remove in the second-stage nitridation; and (f) there is significant loss of boron as a volatile component during the nitridation process. FIG. 1 illustrates that large amounts of water are deleterious to the nitridation process. Specifically, as expected, at constant gas flow rates and $NH_3/N_2$ ratios, the amount of oxygen present in $BN_XO_Y$ powders decreases with increasing reactor temperature from T=600° C. to 1300° C. However, above T=1300° C., the amount of oxygen in the $BN_XO_Y$ powder dramatically increases as a result of a back-reaction between $BN_XO_Y$ and steam or its thermal decomposition products. Due to such drawbacks, alternative solventless or non-aqueous solvent-based aerosol chemical systems have been sought in the industry.

Very few readily available, inexpensive boron reagents exist that are soluble in a non-aqueous solvent appropriate for aerosol formation or aerosol pyrolysis. Similarly, there are very few inexpensive, liquid-phase boron reagents that might be employed directly without a solvent to generate an aerosol. However, at least one family of boron reagents does exist that is commercially available in large quantities at relatively low cost and is soluble in non-aqueous solvents: trialkoxyboranes or trialkylborates, $(RO)_3B$ (e.g., R=Me $(CH_3)$, $Et(C_2H_5)$, $Pr(C_3H_3)$, $Bu(C_4H_9)$). These are free-flowing liquids at 23° C. In addition, there is evidence in the literature that suggests that trialkylborates, $(RO)_3B$, react with the common nitriding reagent ammonia, $NH_3$.

For example, U.S. Pat. No. 2,629,732, discloses that $(RO)_3B$ (R=lower mol. wt. alkyl groups, preferably $CH_3$) reacts with $NH_3$ in a 1:1 ratio in the gas phase at normal atmospheric pressure and temperature to give adducts, $(RO)_3B.NH_3$. Further, other examples in the literature describe a reaction of $(MeO)_3B$ with $NH_3$ that is claimed to form an adduct $(MeO)_3B.NH_3$ that sublimes at 45° C. and allegedly is stable to at least 375° C. (Goubeau et al., Z. *Anorg. Aligem. Chem.* 266, 161–174, 1951). Goubeau et al. also describe reactions that employ other reactant ratios which produce complex product mixtures that are not identified. The chemistry is proposed to involve elimination of methanol and dimethyl ether. U.S. Pat. No. 2,824,787 to May et al. claims the formation of BN from pyrolysis of a gas mixture of $(MeO)_3B$ and $NH_3$ at a furnace temperature above about 850° C. The resulting product is a white powder containing B, N, O, C, and H in varying amounts depending upon reaction conditions. This powder is then heated in $NH_3$ atmosphere to 900–1100° C. to obtain BN. The '787 patent does not describe the morphology and crystallinity of the BN. However, it is likely that these processes produce BN with the traditional platelet morphology.

Further, in a series of patents, Bienert et al. describe the formation of boron-nitrogen-hydrogen compounds, $BN_{3-x}H_{6-3x}$, from the reaction of boron halides or boric acid esters with $NH_3$ in a heated gas flow tube held at 200° C. or 500° C. The resulting compounds are claimed to be useful for making detrition-resistant boron nitride pressed bodies, boron nitride powder and semiconduction components. (Bienert et al., Ger. Offen. No. 1,943,581; Ger. Offen. No. 1,943,582; Ger. Offen. No. 2,004,360; U.S. Pat. No. 3,711,594.) Finally, Murakawa et al. describe the use of $(EtO)_3B$ in a hot gas stream of air and methane to form $B_2O_3$ and C. A powder compact was subsequently heated at 900° C. in $N_2$. It was claimed that h-BN with spherical morphology (ave. diameter, approximately 0.14 micron) formed. (Japanese Patent No. JP60,200,811 to Kokai at al.)

Following from these separate observations, Kroenke, et al. (Organoboron Routes to Boron Nitride), U.S. Provisional Application Ser. No. 60/286,275, (filed Apr. 24, 2001) and (Organoboron Route and Process for Preparation of Boron Nitride), U.S. patent application Ser. No. 10/131/301 (filed Apr. 23, 2002), have shown that liquid $(RO)_3B$ reagents, with and without non-aqueous solvents, may be used to form boron containing aerosols which can be efficiently nitrided in an AAVRS process. The resulting powders have a spherical morphology and contain boron, nitrogen, oxygen, carbon and hydrogen (designated as $BN_XO_YC_Z$) wherein the oxygen contents are much lower (1–30%) than observed in the aqueous aerosol process described in the Pruss, et al. '179 patent for forming $BN_XO_Y$ powders. Further, the oxygen contents of the powders decrease with increasing reactor temperature from approximately 800° C. to approximately 1700° C. as shown in part in FIG. 2. Further, the $BN_XO_YC_Z$ powders with low oxygen contents are readily converted in the first stage reactor system or in a second stage nitridation to BN with oxygen contents of approximately <1% and carbon and hydrogen contents of approximately <0.5%. A further and very important benefit of this precursor system is that the rate of production of $BN_XO_YC_Z$ powder is significantly higher (approximately greater than 30 times higher) than observed in the aqueous based boric acid process described in the Pruss, et al. '179 patent. Therefore, the process described in U.S. Provisional Application Ser. No. 60/286,275 offers significant benefits over the process described in U.S. Pat. No. 6,348,179.

Despite the promising performance of the trialkyl borate aerosol process, there still remains a need in the art for a process that provides spherical boron nitride powders with lower and/or controllable elemental impurity concentrations that employs boron precursor raw materials that are less expensive and preferably less air and moisture sensitive than the alkyl esters of boric acid, $(RO)_3B$.

SUMMARY OF THE INVENTION

The present teachings include a method for making spherical $BN_xO_yC_z$ powder including dissolving boric acid in a liquid amide reagent such as formamide or N,N-dimethylformamide (DMF) to form a solution. An aerosol can then be formed from the solution. A gas stream can be used to carry the aerosolized solution into a furnace. $BN_xO_yC_z$ powder can then be formed by injecting a gaseous nitriding agent into the furnace.

The present teachings also include a method for making hexagonal crystal structure boron nitride powder (h-BN) including dissolving boric acid in a liquid amide reagent such as formamide or N,N-dimethylformamide (DMF) to form a solution, wherein the solution comprises 20 wt % or less of boric acid. An aerosol can then be formed from the solution. A gas stream can be used to carry the aerosolized solution into a furnace. $BN_xO_yC_z$ particles can be formed by injecting a gaseous nitriding agent into the furnace. h-BN powder can then be formed by heat treating the $BN_xO_yC_z$ powder in an atmosphere comprising the gaseous nitriding agent.

The present teachings further include a plurality of hollow spherical particles comprising $BN_xO_yC_z$, the hollow spherical particles being characterized by an average diameter of about 0.1 to about 10 microns and by a surface area of 200 $m^2/g$ or more.

The present teachings also include a plurality of hollow hexagonal crystal structure boron nitride particles (h-BN), the hollow hexagonal crystal structure boron nitride particles being characterized by an average diameter of about 0.1 to about 10 microns and by a surface area of about 200 $m^2/g$ or more

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION

Figure 1:
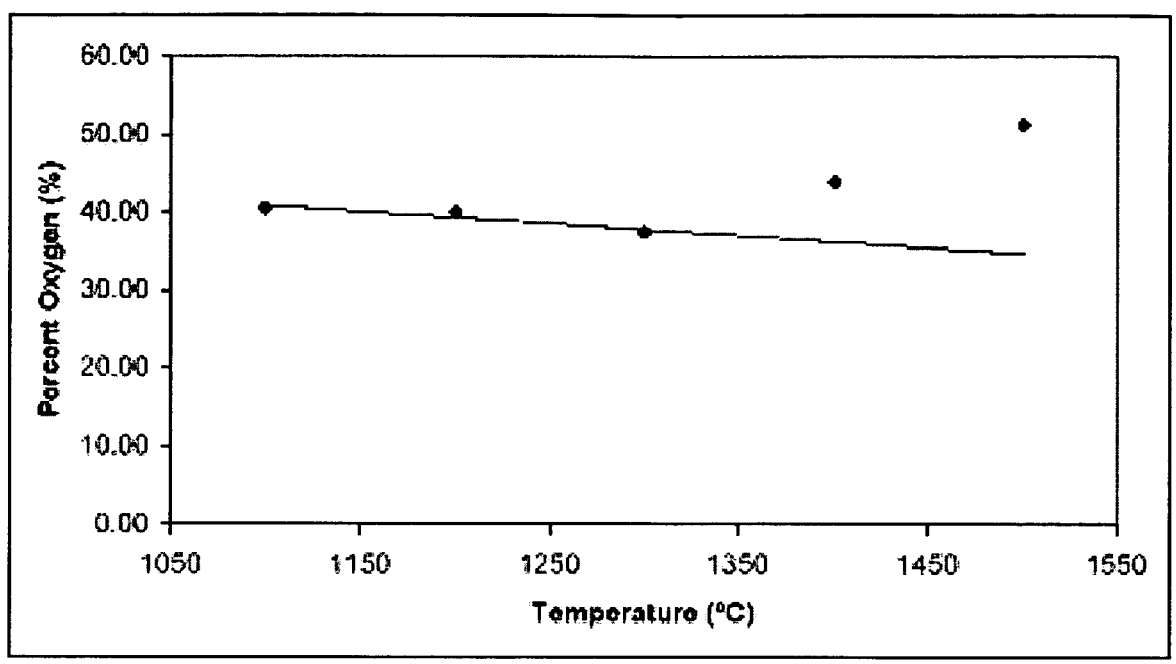
FIG. 1 is a line graph depicting $BN_xO_y$ powder oxygen concentration (wt. %) versus AAVS process temperature from $H_3BO_3/NH_3$ aerosol reaction as practiced in the '179 patent.
Figure 2:
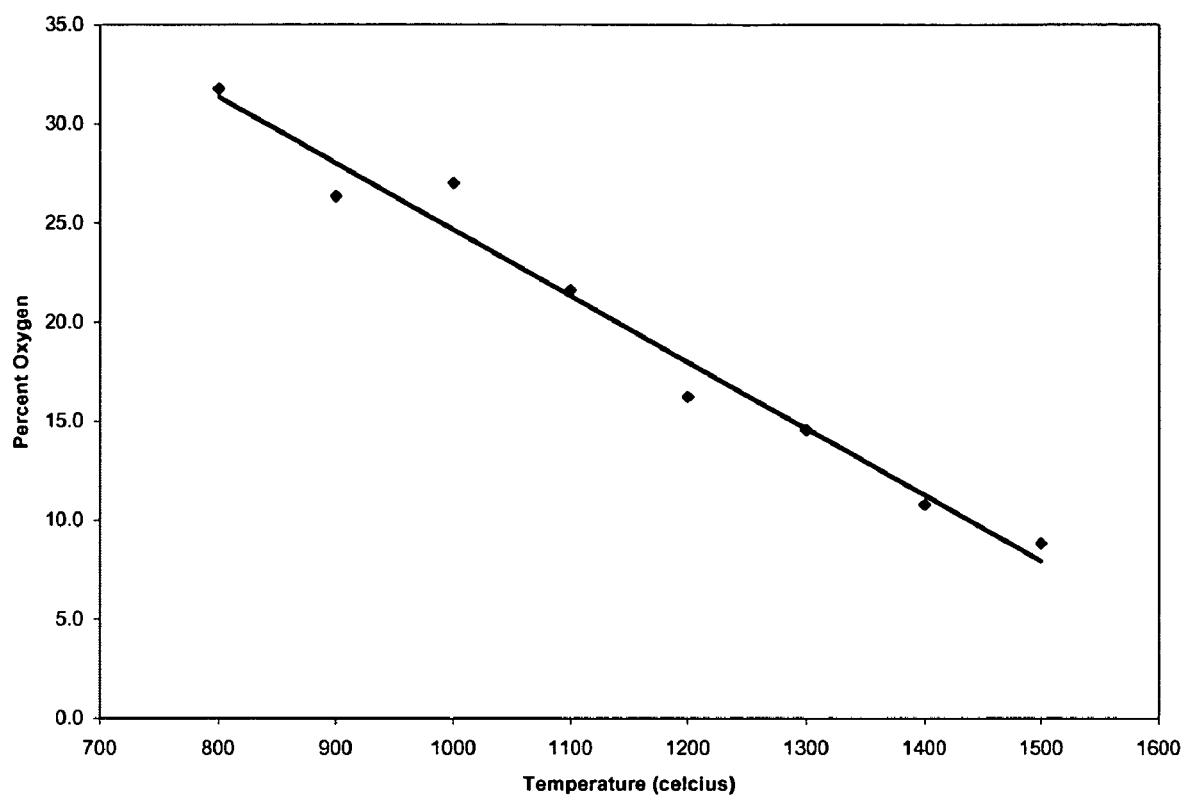
FIG. 2 is a line graph depicting $BN_xO_yC_z$ powder oxygen concentration (wt. %) versus AAVS process temperature from $(MeO)_3B/NH_3$ aerosol reaction as practiced in U.S. Application Ser. No. 60/286,275.

The present teachings include a method for an aerosol assisted vapor phase synthesis (AAVS) process of boron nitride (BN) wherein boron precursors are nitrided in one or two heating steps, and wherein a boron oxide nitride carbide intermediary composition is formed in the first heating step and is further nitrided in the same or a second heating step to form resultant dense or hollow, spheroidal boron nitride powders including spheroidal particles with surfaces that are smooth, bladed, have protruding whiskers and/or form platelet particles, and are of turbostratic or hexagonal crystalline structure.

Although use of trialkylborates in an AAVS process to form spherical morphology BN powders shows considerable commercial and laboratory promise, trialkylborates are somewhat moisture sensitive and the precursors are currently more expensive than the commonly employed precursors, $H_3BO_3$ and $B_2O_3$, used to make the standard, commercial platelet morphology BN powders. A more cost-effective raw material for the AAVS process described herein provides not only the same range of materials described in U.S. Provisional Application No. 60/286,275 (incorporated herein by reference and filed by several of the same inventors of the present invention and commonly owned by the same assignee), but also an additional range of materials. This more cost-effective raw material for the AAVS process uses solutions containing, preferably, $H_3BO_3$, $B_2O_3$ ammonium borates and polyborates, or mixtures thereof, dissolved in non-aqueous solvents such as but not limited to alcohols, such as, for example methanol (MeOH), and amides, such as, for example, formamide and N,N-dimethylformamide (DMF), or partially aquated solvents or solutions, to form an aerosol mist wherein the aerosol droplets produced contain boron species in high concentrations.

In exemplary embodiments, the precursor $H_3BO_3$ dissolved in an amide solvent (for example, formamide or N,N-dimethylformamide (DMF)) or partially aquated ("wet") amide solvent can be used to form an aerosol mist wherein the aerosol droplets produced contain boron species in high concentrations that largely form hollow $BN_xO_yC_z$ particles.

The boron-containing raw material of the present teachings may be chosen from the group of commercially available materials including but not limited to boric acid, $H_3BO_3$, boric oxide, $B_2O_3$, ammonium borates and polyborates. These can be dissolved in a non-aqueous solvent or solvent mixture, including but not limited to alcohols and amides. Preferably, the non-aqueous solvent comprises simple alcohols, including but not limited to, methanol and ethanol, or a combinations thereof. However, in some cases, the solvent may be partially aquated. The amides can include, for example, formamide or N,N-dimethylformamide. In such cases, the range of water concentration can be less than or equal to 50 wt. % of water. According to various other embodiments, the range can be less than or equal to 10 wt. % of water. In other cases, the boron precursor may be a hydrate, such that the resultant solution maintains a concentration of water of less than or equal to 50 wt. % of water. According to various other embodiments, the range can be less than or equal to 10 wt. % of water. The solution can be transferred to an aerosol generator system such as the one depicted in FIGS. 4 and 5, utilizing bench or commercial scale models. According to various embodiments, the molar ratios of boron reagent to, for example, MeOH, can be approximately 1:6 to approximately 1:40, and, in various other embodiments, approximately 1:6 to approximately 1:20. According to various other embodiments, the molar ratios of boron reagent to, for example, DMF, can be approximately 1:4 to approximately 1:40, and, in various other embodiments, approximately 1:4 to approximately 1:20.

These high concentration boron aerosols can be introduced (e.g., injected) in a carrier gas stream (comprising, for example, nitrogen, argon, other inert gases known in the art, or combinations thereof and can be further introduced (e.g., swept) into a reaction zone of an aerosol assisted vapor phase reactor system (AAVRS) as better described below. The aerosols can then be reacted there or are allowed to react with $NH_3$, an $NH_3$/inert gas mixture, or other appropriate nitriding gases or gas mixtures, converting the aerosol to $BN_xO_YC_Z$ or BN particles depending upon the reactor temperature, gas flow rates, $NH_3$ or other nitriding agent concentration and aerosol residence time. In a fashion similar to the aqueous $H_3BO_3/NH_3$ and solvent-less $(MeO)_3B/NH_3$ systems (FIGS. 1 and 2), the oxygen contents of the $BN_xO_yC_z$ particles formed from non-aqueous solutions of the boron precursors decrease with increasing process temperatures in the range 800° C. to 1400° C. In addition, at equivalent temperatures and reactor operating conditions, the oxygen contents of particles formed using DMF or formamide are lower than other non-aqueous solvent systems. For example, FIG. 13 depicts $BN_xO_yC_z$ powder oxygen concentration in wt. % versus AAVS process temperature from exemplary $H_3BO_3$/DMF aerosol reactions. These primary $BN_XO_YC_Z$ or BN particles may be unagglomerated, loosely agglomerated or tightly agglomerated depending upon synthesis conditions. Where required, the isolated powders can be further calcined in $NH_3$, $NH_3/N_2$, $N_2$, or other suitable nitriding agents, to form primary crystalline BN particles with oxygen contents of approximately <1% and carbon contents of approximately <0.5%.

The dense or hollow $BN_XO_YC_Z$ or BN primary particles can have spherical morphology in the micron- to nano-dimension range and can have smooth, bladed, partially bladed, partially textured, fibrils, or whisker surface nanostructures, or platelet or nanoplatelet shapes. The calcined BN particles can have a similar range of unagglomerated, loosely agglomerated, or tightly agglomerated or partially sintered configurations, depending upon calcining conditions and type of aerosol precursor. They can also be dense, hollow, and porous.

$BN_XO_YC_Z$ powders can further contain carbon, which can be removed, leaving a "tailored porosity and morphology" in the primary particles of BN. The non-aqueous or partially aquated solutions used to form the aerosol can also contain non-aqueous or aqueous solvent soluble additives that affect the aerosol conversion process, leading to a greater selectivity in final powder properties and/or morphology and/or crystallinity.

Exemplary systems of the present teachings can produce negligible gaseous by-products (mainly CO, $CO_2$ and $H_2$) formed in the decomposition of non-aqueous solvent such as MeOH or DMF in $NH_3$, and additionally, for example, in the reactions of $H_3BO_3$, $B_2O_3$, and borates with ammonia and non-aqueous solvent or their decomposition products.

When the reactor is run in the lowest preferred temperature range, urea may also be produced in situ with the $BN_XO_YC_Z$ powder, from which the urea is easily removable if necessary or desired. The urea is intimately mixed with the $BN_XO_YC_Z$ powder. Excess $NH_3$ and inert carrier gas dilute any gaseous or aerosolized by-products which are then swept from the system.

Overall production yields of ceramic powders are high (typically, approximately 60–90% in the bench scale laboratory reactor described herein, however, other yield ranges may be possible), and the simple process design and low operational costs are favorable for commercial applications.

Process Advantages

Compared to the process that utilizes trialkylborates as precursors, which already realizes a large advance over current commercial technology, the current invention can provide one or more of the following advantages in process:

1. Use of readily available, less expensive boron-containing starting materials.

2. Use of non-aqueous solutions such as alcohol or amide solutions of less expensive starting materials that are much less air and moisture-sensitive than neat $(RO)_3B$ liquids.

3. An aerosol containing controllable amounts of carbon that improves the parallel carbothermal reduction/conversion of B—O species into boron nitride, h-BN.

4. Ready and complete conversion of the boron precursors to BN powders.

5. Formation of dense or hollow spherically shaped $BN_xO_yC_z$ and BN powders containing controlled porosity and defined dopants/processing aides.

6. Option to produce largely hollow and porous $BN_xO_yC_z$ and BN powders.

7. Option to prepare intimate mixtures of $BN_XO_YC_Z$ with in situ formed urea.

8. Option to manufacture partially sintered BN powder agglomerates after annealing $BN_XO_YC_Z$ at approximately 1600° C. or higher without additional processing and/or use of additives.

9. Option to obtain modified surface structure features.

10. Option to produce BN material with densities in range of approximately 1.0 to approximately 2.2 g/cm$^3$.

11. Option to produce BN nanocomposite materials.

Exemplary processes, forming a boron-nitrogen-oxygen-carbon-hydrogen intermediate composition ($BN_XO_YC_Z$) and forming from such composition the desired spherically shaped or modified spherical morphology BN powder having either a turbostratic (t-BN) or a hexagonal (h-BN) crystal structure, as more particularly described herein, and can include the following steps: (1) introducing a boron reagent precursor dissolved in a non-aqueous solvent such as, but not limited to methanol, formamide, N,N-dimethylformamide (DMF), (2) creating an aerosol of the boron precursor reagent solution by using an aerosol generator, (3) using an inert carrier gas to sweep the aerosol droplets generated into a furnace, (4) injecting a gaseous nitriding agent (or a nitriding agent aerosol on a carrier gas) into the furnace, and (5) maintaining the temperature of the furnace within a temperature range of approximately 600° C. to approximately 1800° C. Additional steps of the method can be utilized, including (6) heat-treating the $BN_XO_YC_Z$ precursor particles after step 5 (and possibly, including another step (5b), collecting the resultant intermediate, $BN_XO_YC_Z$ powder particles) at approximately 600° C. to approximately 1800° C. under nitriding conditions. Another possible collecting step, (7), would comprise collecting the fully nitrided particles. The process may be further modified by introducing non-aqueous solvent soluble additives in the solution of step (1) which allows for the formation of $BN_XO_YC_Z$ powders containing additional elements that modify the composition, crystallinity, and/or properties of the resulting BN materials.

The aerosol assisted vapor phase reactor system (AAVRS) apparatus for forming spherical BN as described above typically comprises an aerosol generator system (capable of producing an aerosol spray of droplets of the preferred non-aqueous boron precursor solution), a means for injecting the aerosol droplets composed of the boron precursor and non-aqueous solvent in an inert carrier gas into a heated reactor tube at a controlled flow rate, and a means for injecting a gaseous nitriding agent (or aerosol containing a liquid nitriding agent in an inert carrier gas) separately into the furnace (preferably substantially simultaneously to the injection of the reagent solution/carrier gas aerosol).

Figure 3:
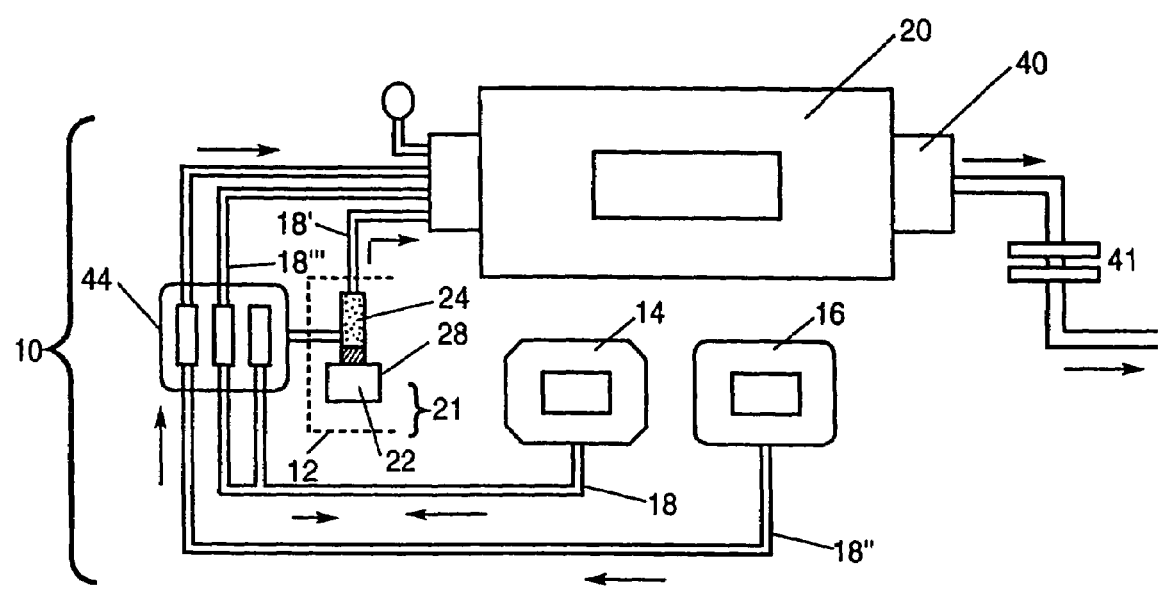
FIG. 3 is a schematic drawing of an aerosol assisted vapor phase synthesis (AAVS) reactor system in accordance with the present invention.

Turning now to the drawings, a schematic diagram of an aerosol assisted vapor phase reactor system (AAVRS) 10 used in accordance with the method of the present invention is shown in FIG. 3. The AAVRS 10 depicted is a "bench scale" system, but the methods of the present invention additionally apply to an apparatus on a commercial production scale. AAVRS 10 comprises aerosol generator assembly 12, inert carrier gas source 14, nitriding source 16, connection systems 18, 18', 18", 18''' furnace 20, wherein furnace 20 further preferably comprises furnace tube 40, and preferably, collection device 41.

Generator assembly 12 can comprise ultrasonic transducer assembly 21. Other generator assemblies may be utilized, including but not limited to spray nozzles, nebulizers, and atomizers. It should be understood that many different aerosol generator geometries may be employed as the droplet generator. The selection of a particular aerosol or droplet generator and droplet delivery system or geometry will preferably depend upon the AAVRS type and size, target droplet size, droplet size distribution, droplet delivery rate and chemical composition of the droplet. For example, an impactor (e.g., barrier) may be inserted in-line in the delivery system to modify the particle size distribution and decrease the delivery rate. Different spray nozzle designs may be employed to vary the size of the droplets; different additives can be added to the boron reagent solution to modify the surface tension of the solution; and the solubility of the boron reagent may be varied by varying the temperature (i.e., solubility is increased with an increase in temperature) and/or the solvent utilized.

Transducer assembly 21 can comprise humidifier base 22, glass chamber 24, diaphragm 26, and ultrasonic transducer 28. Humidifier base 22 contains transducer 28 and may be a preformed commercial unit (e.g., Holmes Model 643B). Water or another suitable liquid fills base 22, contacting both diaphragm 26 and transducer 28.

Figure 4:
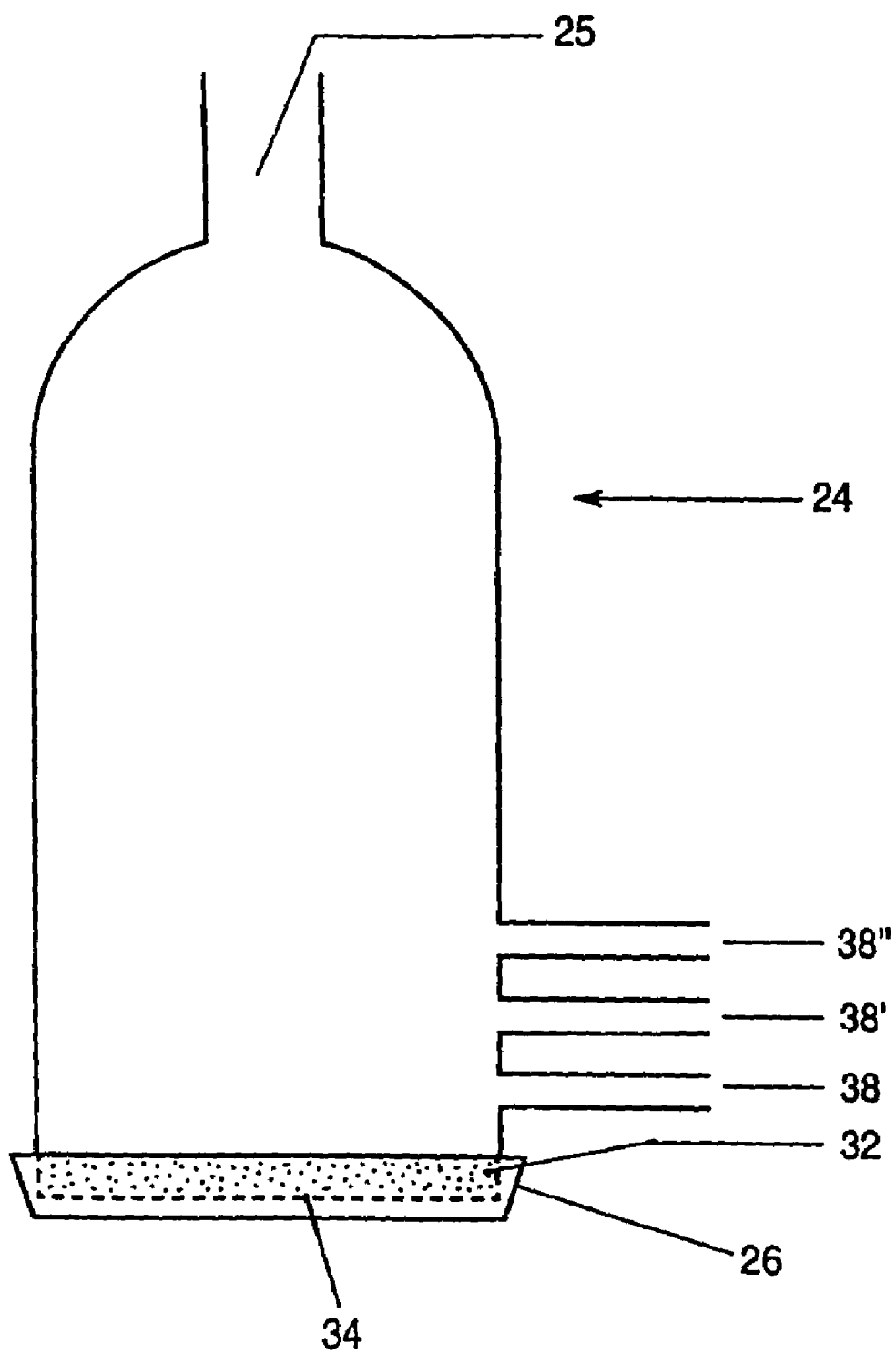
FIG. 4 is a schematic drawing of a typical single transducer reagent container (glass chamber)
Figure 5:
FIG. 5 is a scanning electron micrograph (SEM) of $BN_xO_yC_z$ powder prepared from $B_2O_3$/MeOH (ratio of approximately 1:12), at 1000° C. ($N_2$=0.5 L/min; $NH_3$=3.5 L/min)
Figure 6:
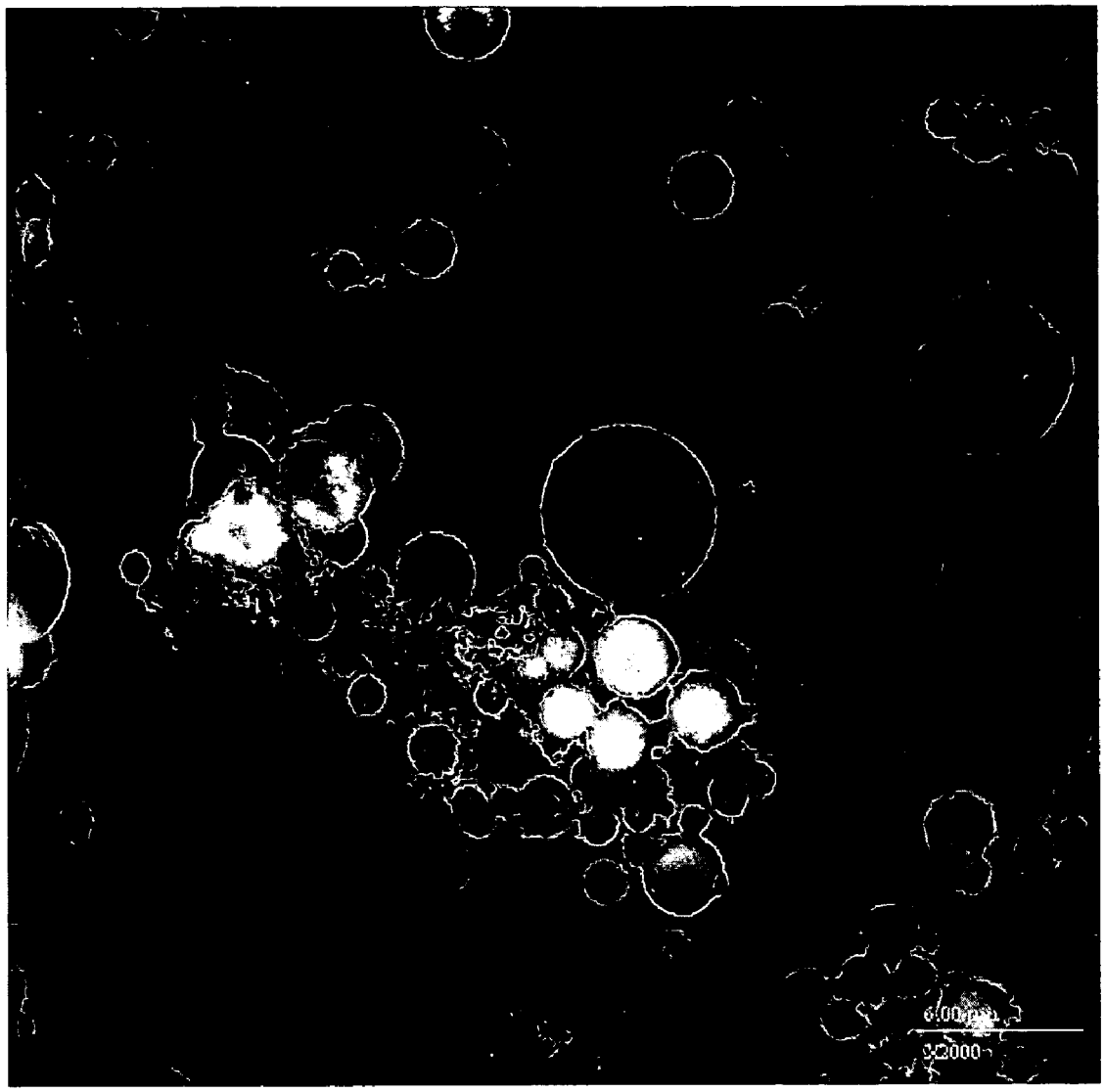
FIG. 6 is a scanning electron micrograph (SEM) of $BN_xO_yC_z$ powder obtained from $H_3BO_3$/MeOH (ratio of approximately 1:8), at 1000° C. ($N_2$=0.5 L/min; $NH_3$=3.5 L/min)
Figure 7:
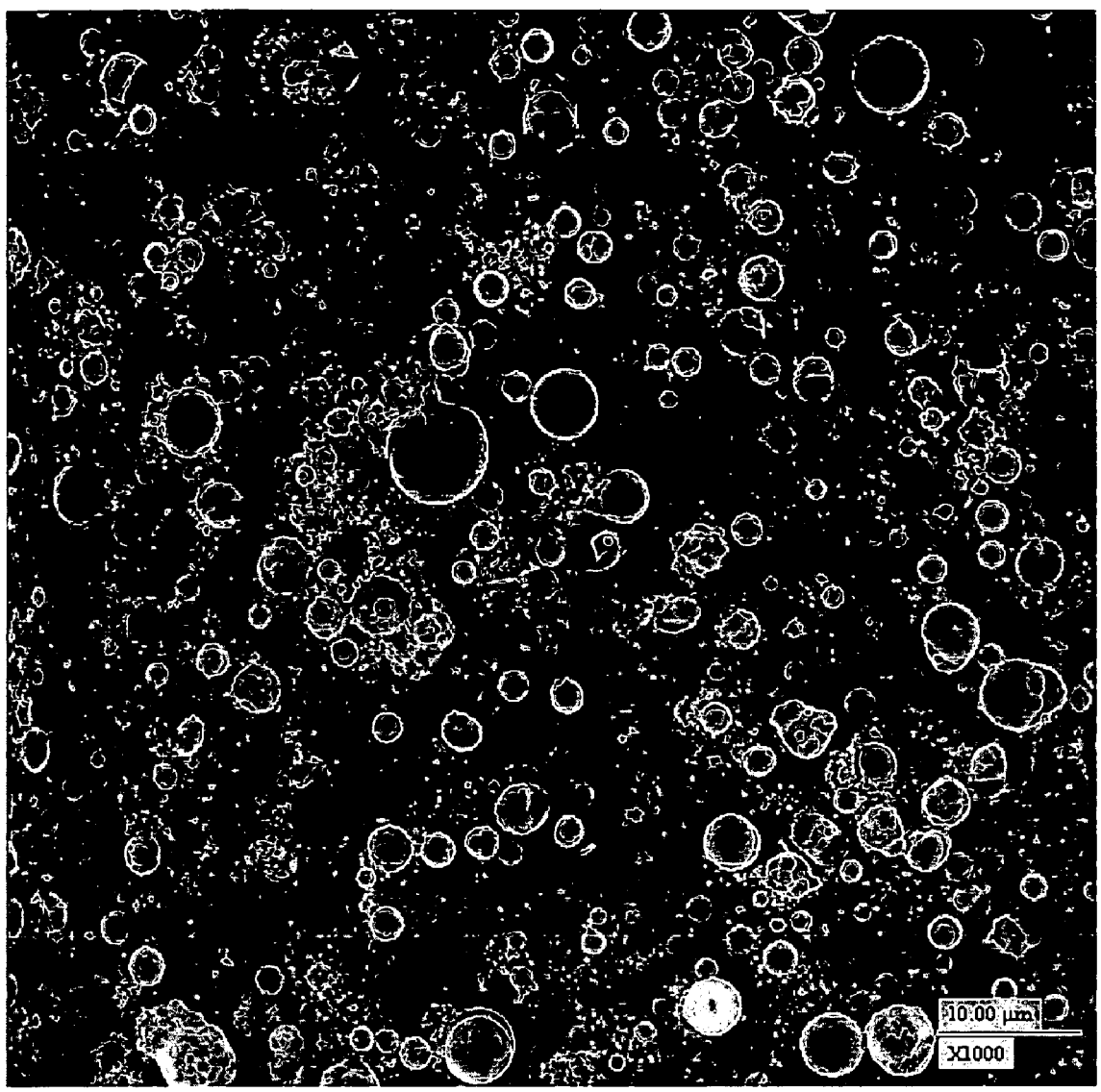
FIG. 7 is a scanning electron micrograph (SEM) of $BN_xO_yC_z$ powder prepared from $B_2O_3$/MeOH (ratio of approximately 1:12), at 1400° C. ($N_2$=0.5 L/min; $NH_3$=3.5 L/min)
Figure 8:
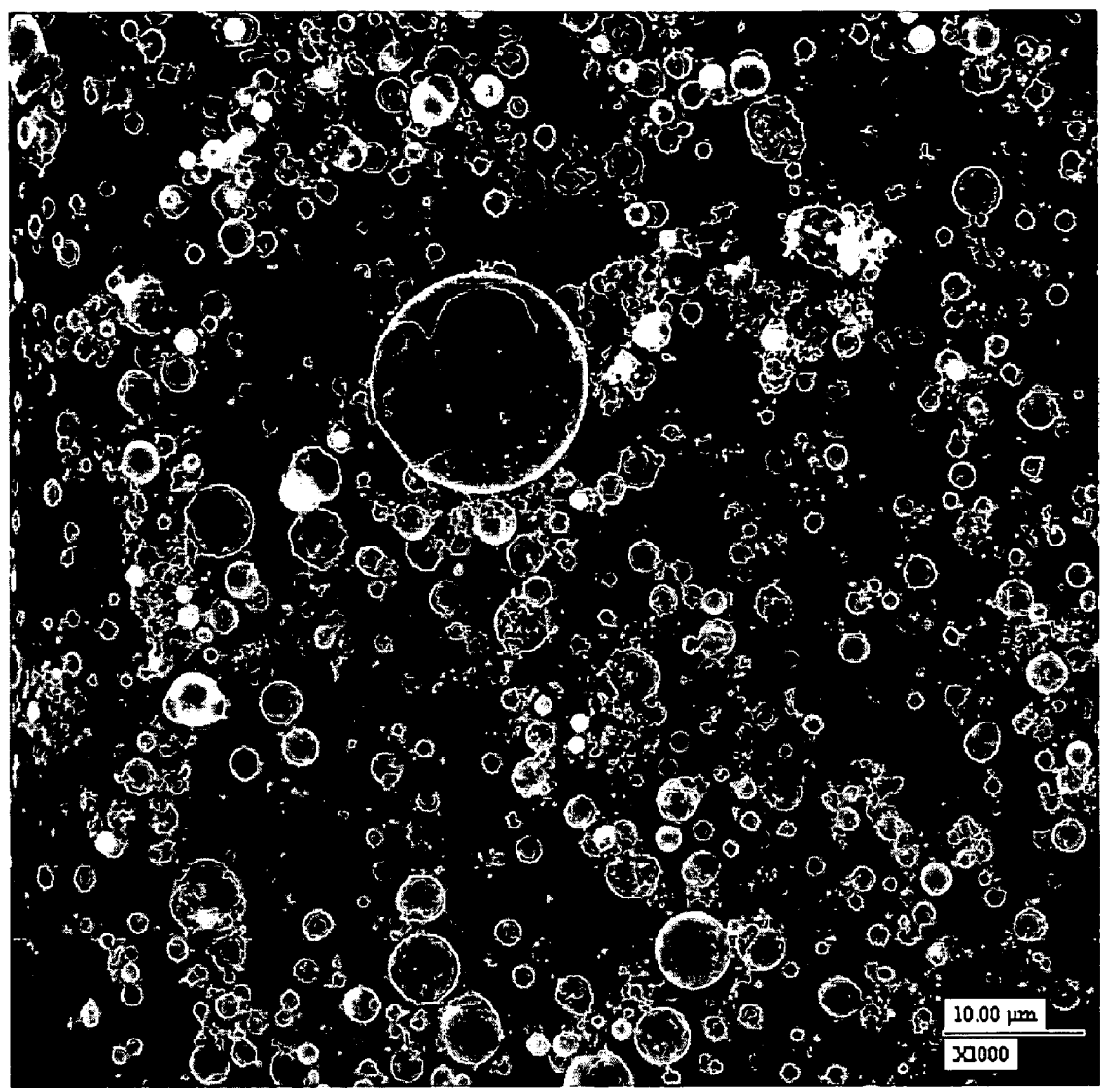
FIG. 8 is a scanning electron micrograph (SEM) of $BN_xO_yC_z$ powder prepared from $H_3BO_3$/MeOH (ratio of approximately 1:8), at 1400° C. ($N_2$=0.5 L/min; $NH_3$=3.5 L/min)
Figure 9:
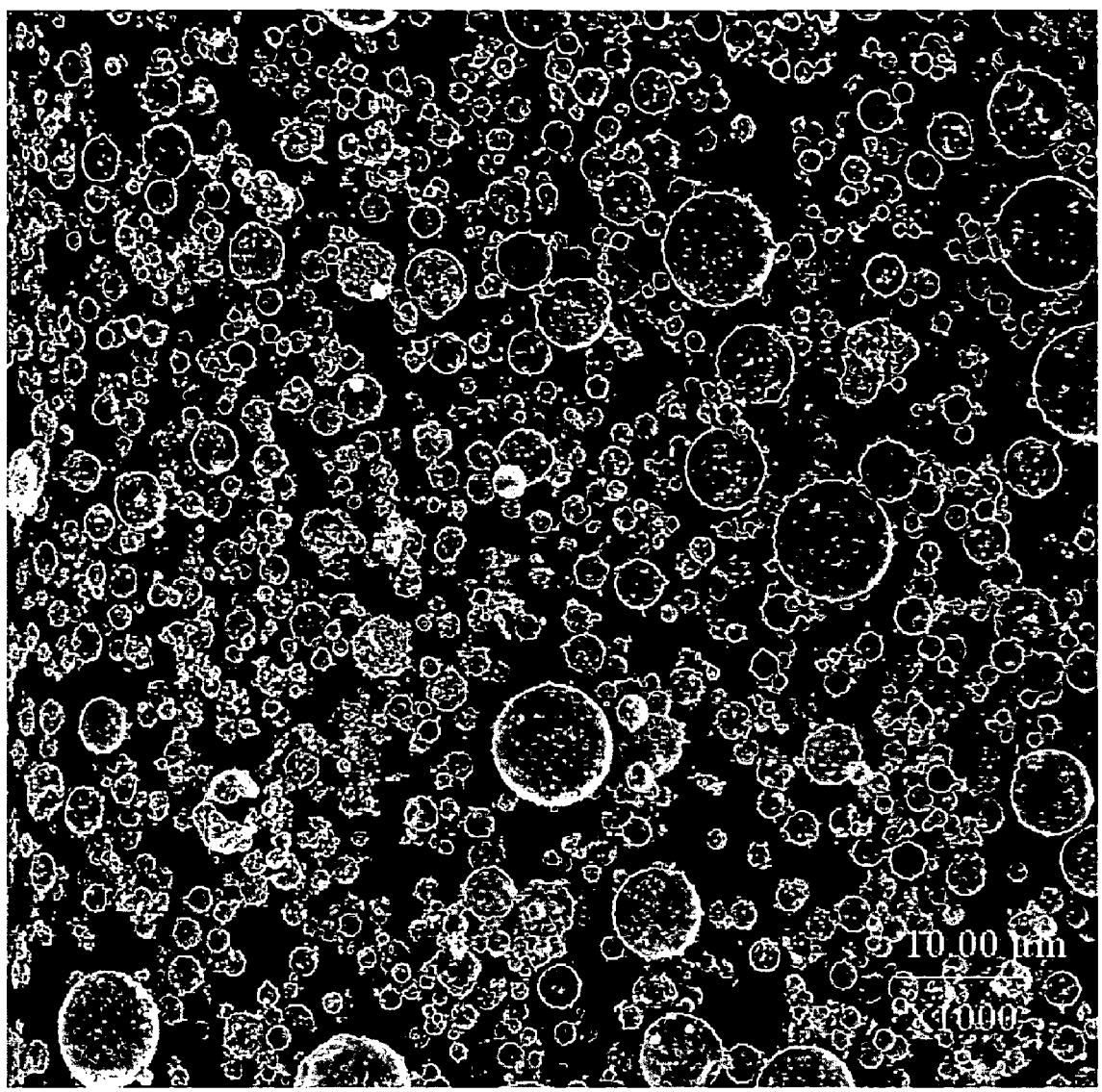
FIG. 9 is a scanning electron micrograph (SEM) of $BN_xO_yC_z$ powder prepared from $NH_4B_5O_8.4H_2O$/MeOH (in a concentration of approximately 0.5M), at 1200° C. ($N_2$=0.5 L/min; $NH_3$=3.5 L/min)
Figure 10:
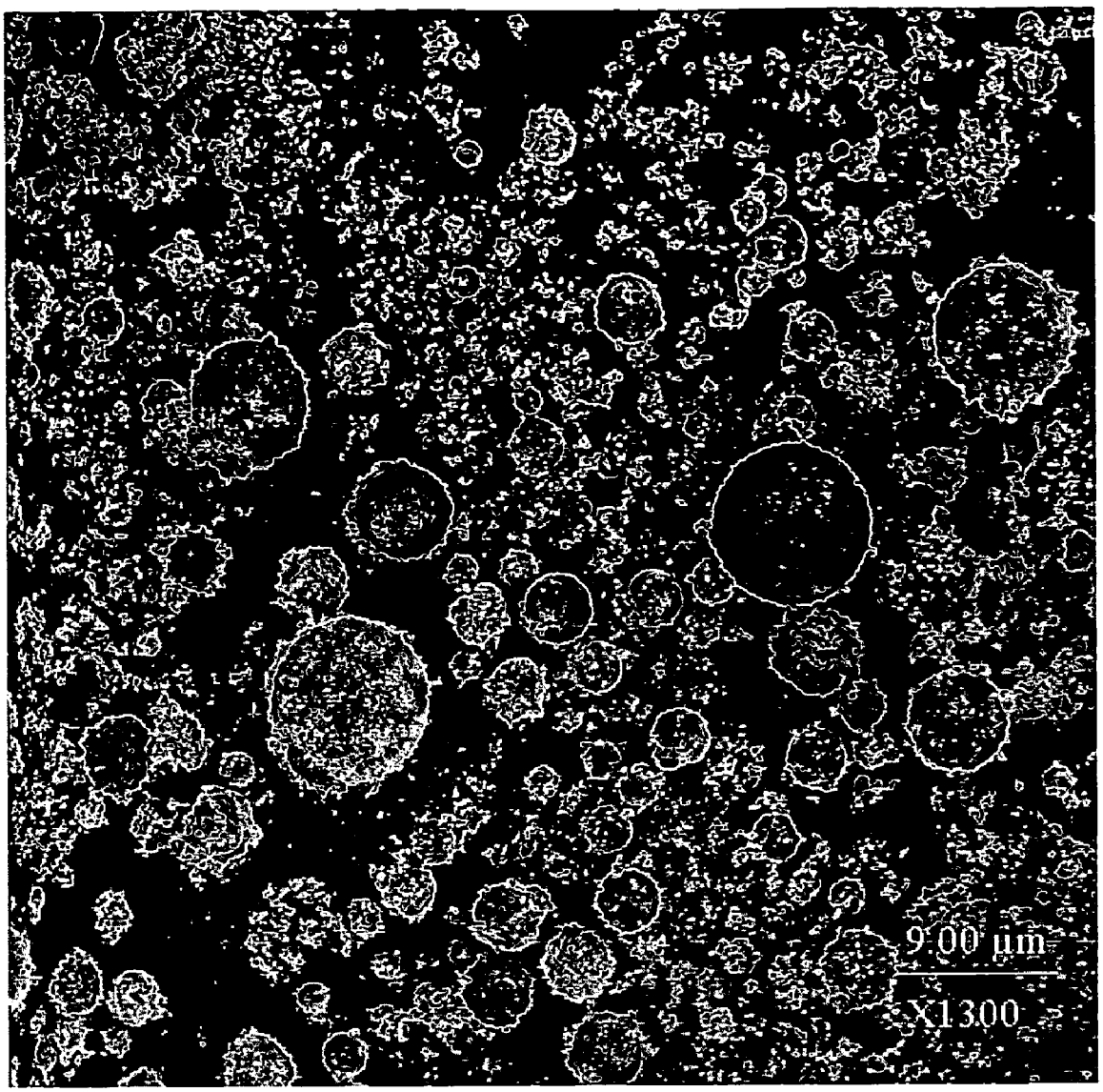
FIG. 10 is a scanning electron micrograph (SEM) of $BN_xO_yC_z$ powder prepared from $NH_4B_5O_8.4H_2O$/MeOH (in a concentration of approximately 0.5M), at 1500° C. ($N_2$=0.5 L/min; $NH_3$=3.5 L/min)
Figure 11:
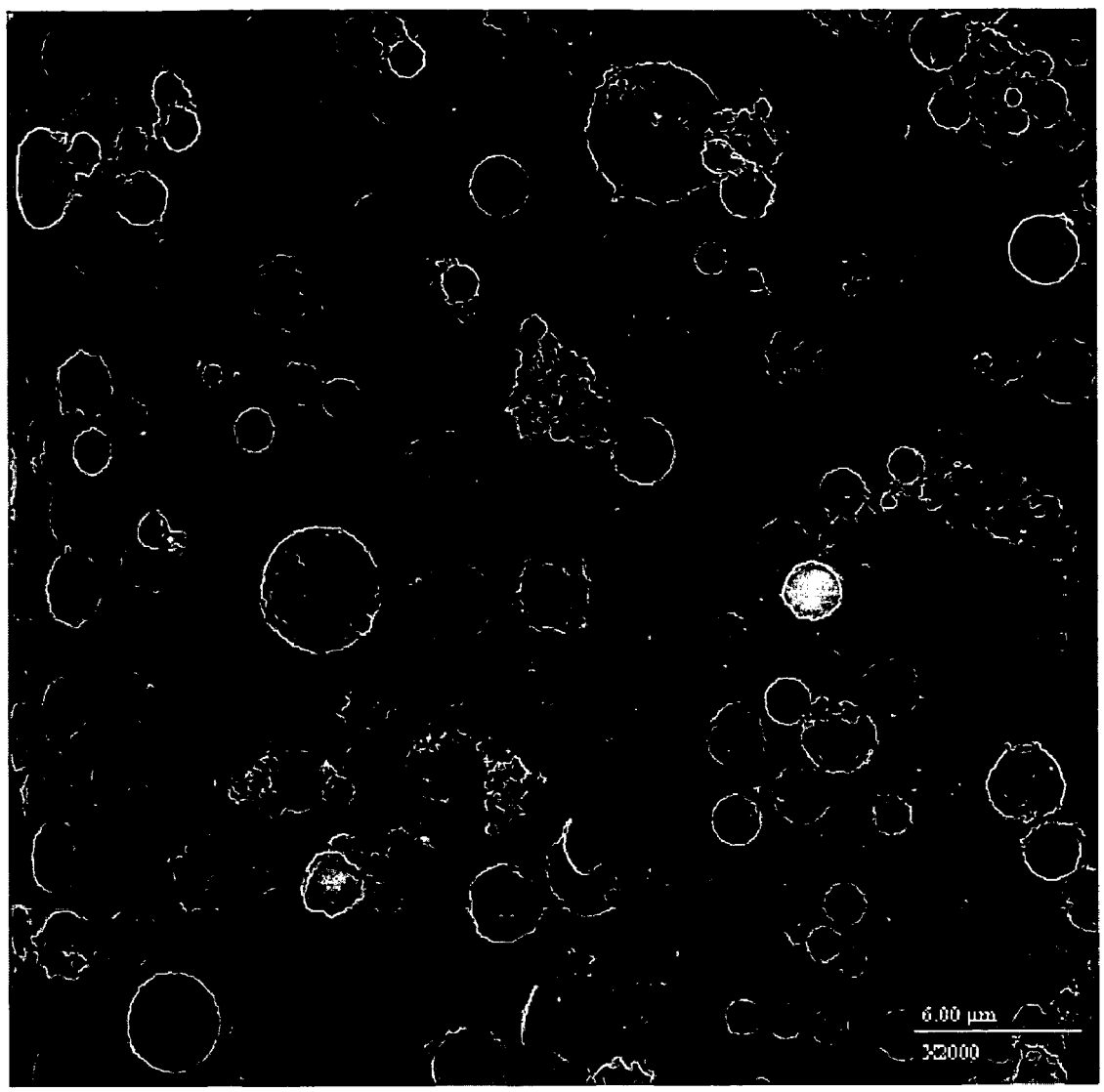
FIG. 11 is a scanning electron micrograph (SEM) of BN powder obtained from $BN_xO_yC_z$ powder prepared from $B_2O_3$/MeOH (ratio of approximately 1:12) at 1000° C. ($N_2$=0.5 L/min; $NH_3$=3.5 L/min) and calcined at 1600° C. ($NH_3$=0.2 L/min).
Figure 12:
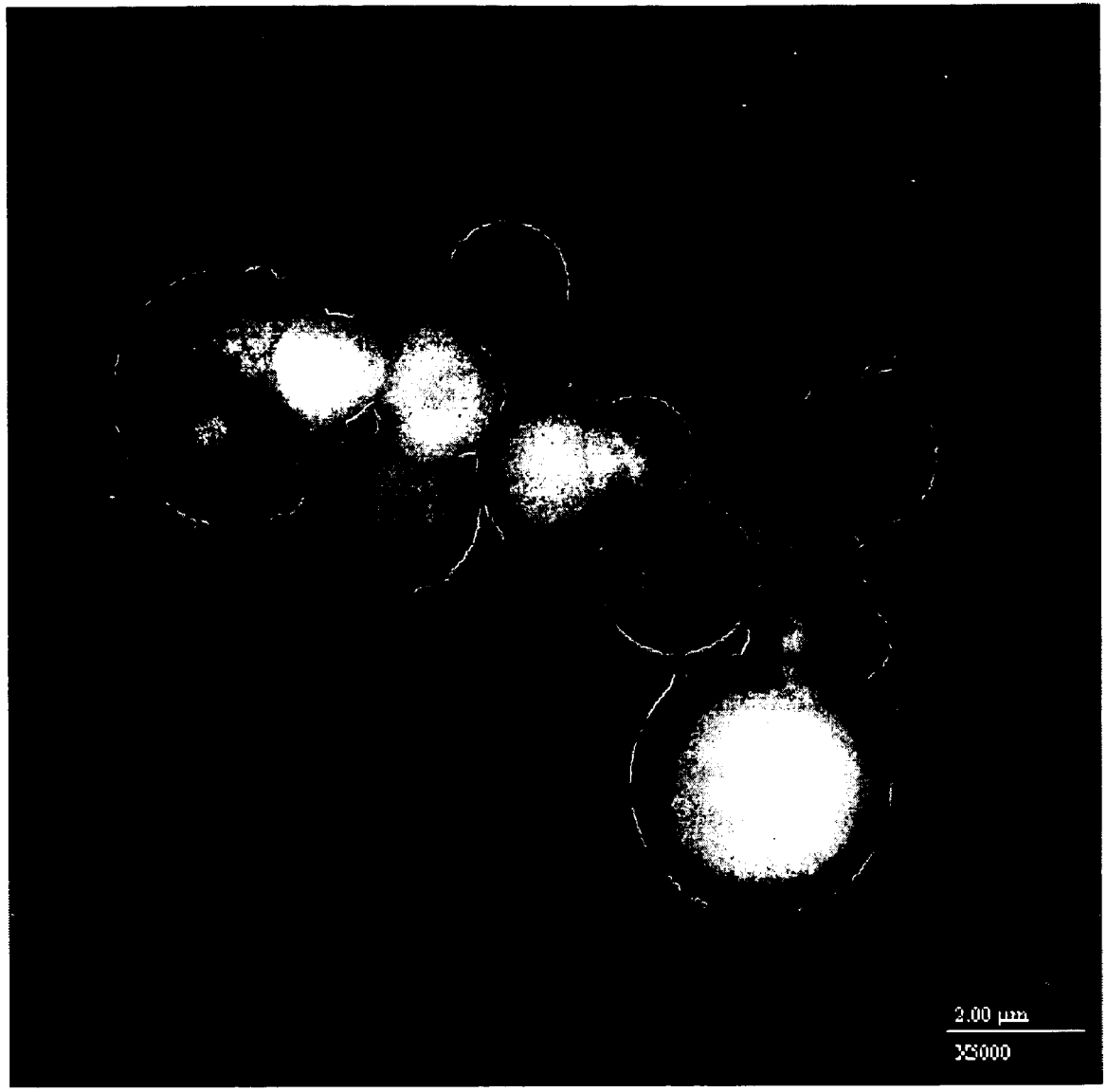
FIG. 12 is a scanning electron micrograph (SEM) of BN powder obtained from $BN_xO_yC_z$ powder prepared from $B_2O_3$/MeOH (ratio of approximately 1:12) at 1400° C. ($N_2$=0.5 L/min; $NH_3$=3.5 L/min) and calcined at 1600° C. ($NH_3$=0.2 L/min)
Figure 13:
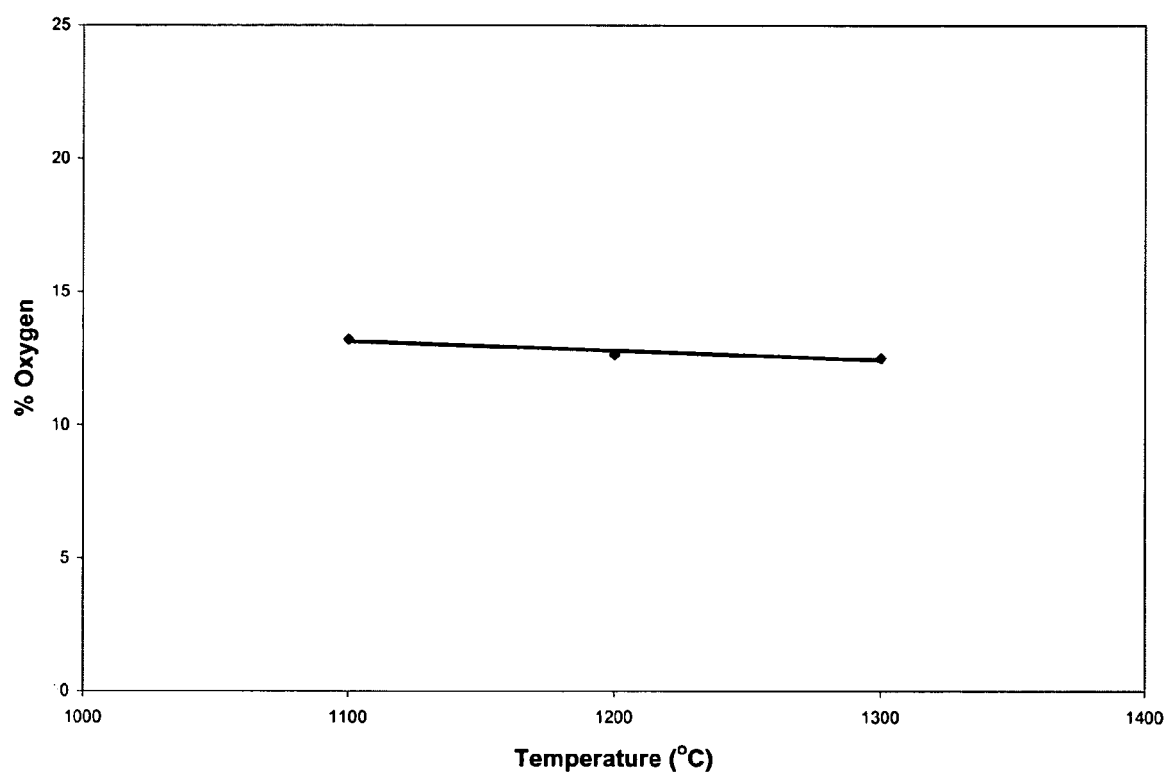
FIG. 13 is a line graph depicting $BN_xO_yC_z$ powder oxygen concentration (wt. %) versus aerosol assisted vapor phase synthesis (AAVS) process temperature from $H_3BO_3$/DMF aerosols in accordance with the present teachings.
Figure 14:
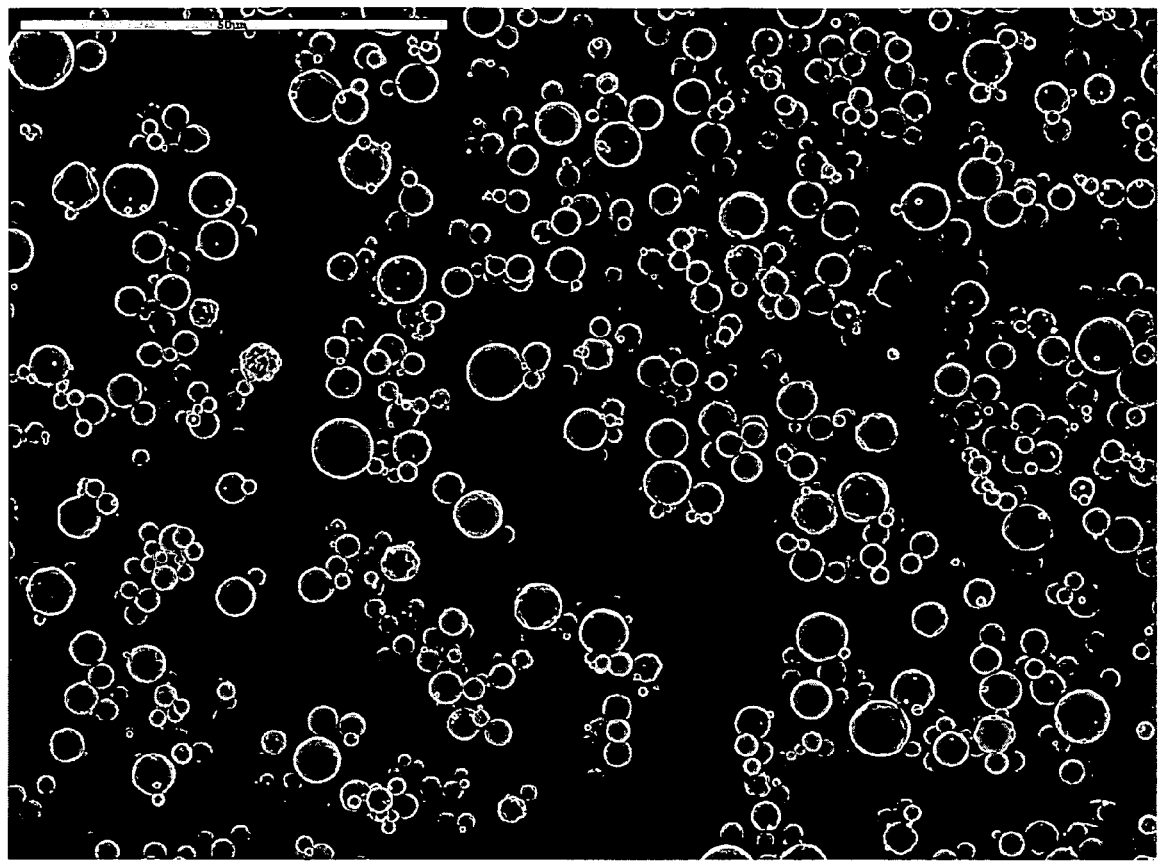
FIG. 14 is a scanning electron micrograph (SEM) of BNxOyCz powder/particles formed according to the present teachings.
Figure 15:
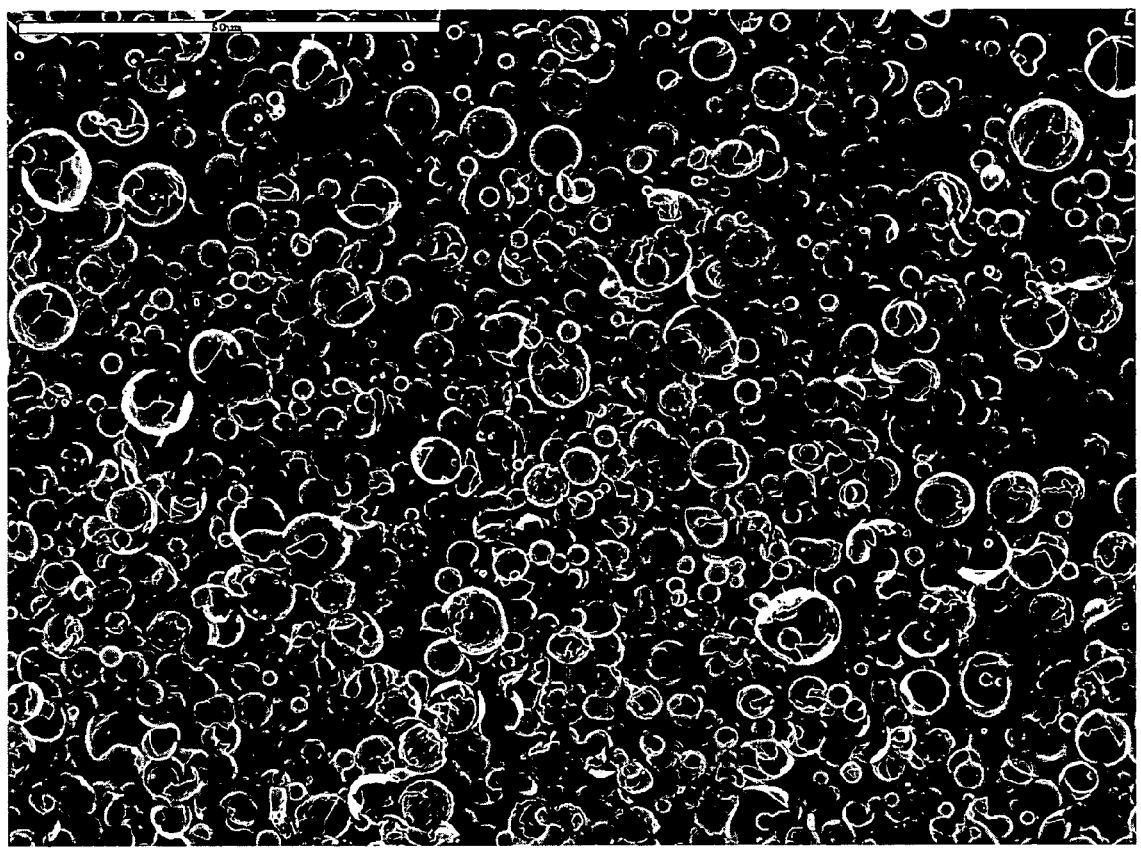
FIG. 15 is a scanning electron micrograph (SEM) of hollow BN powder/particles formed according to the present teachings.

Glass chamber 24 can comprise multiple configurations including, but not limited to the flask shape shown in FIG. 4. Glass chamber 24 comprises at least one outlet 25 in connected relation to connection system 18'. Connection system 18' is disposed between chamber 24 and furnace tube 40. Glass chamber 24 additionally comprises at least one inlet 38 in connected relation to connection system 18 and to a boron reagent solution storage vessel (not shown). Connection system 18 is disposed in connected relation between chamber 24 and inert gas source 14. Additional inlets such as inlets 38', 38" depicted in FIG. 4, may also be utilized to connect additional inert gas sources or for sweeping a lower density of aerosol droplets into 18'. Inlet 38 may be used for continuous or batch transfer of precursor solution 32 to chamber 24. Accordingly, multiple lines of connection system 18 may be utilized when multiple inlets or outlets are used.

Diaphragm 26 can comprise a thin, flexible material such as polyethylene, which has a suitable tension for transmitting ultrasonic energy from an emitter source 28 to liquid precursor solution 32 contained within glass chamber 24 (See FIGS. 3 and 4). In various embodiments, diaphragm 26 will also be comprised of a suitably inert material with respect to the utilized precursor solution. Other polymers and/or membranes may be suitable for the diaphragm material, provided they comprise a suitable tension and are chemically inert to the precursor. Additionally, a method known in the art of using a chamber comprised entirely of glass, wherein the "diaphragm area" is comprised of a very thin glass layer, may be employed. As a result, other such materials known in the art may be utilized for the diaphragm. Diaphragm 26 is stretched fittingly over bottom 34 of glass chamber 24, and may be attached with means known in the art, such as but not limited to, a fitted ring. Diaphragm 26 can be positioned in relation to transducer 28 for best sonic transmission, and/or with transducer 28 immediately proximate to diaphragm 26 and centrally positioned, but leaving a small gap as is commonly known in the art.

Ultrasonic transducer 28 is mounted in humidifier base 22 and preferably comprises a piezoelectric crystal, but may comprise other transducers known in the art. Transducer 28 is electrically stimulated, thereby creating ultrasonic stimulation of diaphragm 26. Diaphragm 26 transmits the ultrasonic energy to precursor solution 32, thereby creating an aerosol of precursor solution 32. Other aerosol generator configurations known in the art may be utilized in performing the methods of the present invention. Additionally, multiple generators may be utilized. However, in various embodiments the amount of aerosol generated by such generators can be proportioned to the size of the reactor furnace.

Inert carrier gas source 14 typically comprises a gas tank or chamber containing an inert gas or gas mixture, such as but not limited to $N_2$ and Ar. Other inert gases and mixtures thereof known in the art may also be utilized in the present invention. As shown in FIG. 3, inert carrier gas source 14 is connected to chamber 24 by connection system 18 comprising tubes, connected chambers, pipes, or other delivery mechanisms known in the art, and disposed between source 14 and chamber 24. The cannier gas is injected into aerosol chamber 24 (containing boron precursor solution 32) at inlet 38' or 38" as depicted in FIG. 4. If multiple chambers 24 and/or sources 14 are utilized, more inlets may be used. In various embodiments, at least two inlets or one valved inlet (wherein precursor solutions and various inert gas flows may alternately be blocked or allowed passage past the valve, thereby alternating flow of precursor solution or inert gas into the chamber) be available and/or used to provide for a suitable flow of the carrier gas, accommodating differing aerosol densities within the aerosol chamber. Spacing between inlets need not be uniform, and may vary. Varied spacing may be useful for different inlet purposes. For example, on a multiple-inlet chamber (such as depicted in FIG. 4), bottom inlet 38 is typically used to batch transfer the precursor solution into the chamber. Upper inlets 38', 38" may be used for flow of carrier gas to mix with different density levels of aerosol (e.g., the lower the height of the aerosol within the chamber, the higher the density of the aerosol). The carrier gas serves to transport aerosol droplets of precursor solution 32 into furnace 20, by carrying the aerosol droplets through connection system 18', disposed between chamber 24 and furnace tube 40. In various embodiments, the flow rate of the carrier gas through connection system 18' corresponds to the flow rate of the carrier gas through connection system 18.

Nitriding gas source 16 typically comprises a gas tank or chamber containing a nitrogen-containing gas or gas mixture known in the art, preferably $NH_3$. The nitrogen-containing gas mixture may comprise a liquid or solution suitable for nitriding that is aerosolized and therefore utilizes an inert carrier gas for flow into the furnace. Nitriding gas source 16 is connected to furnace tube 40 by connection system 18". In alternate embodiments, connection system 18", as depicted in FIG. 3, additionally flows from inert carrier gas source 14 to furnace 20, for direct flow of the inert gas into furnace tube 40. While this is not critical to the AAVS process described herein, it is helpful in the process, for example, in maintaining a gas flow pressure to "push" the remaining aerosol entrained in the reactor and connecting tubes through into the furnace after the aerosol generator has been turned off.

Connection systems 18', 18", 18''' join to a gas tight end cap disposed in the proximate end of furnace tube 40 of furnace 20. The carrier gas, carrying the aerosol droplets, flows through connection system 18' into tube 40. In various embodiments, at essentially the same time, the nitriding gas is separately injected into furnace tube 40 through connection system 18" at a flow rate approximately proportional to the flow rate of carrier gas. In alternate embodiments, different flow rates may be utilized. The flow rate may comprise a flow proportion of between approximately 5:1 of $N_2:NH_3$ to approximately 1:20 of $N_2:NH_3$. In various embodiments, however, that the flow rate comprises a flow proportion of between approximately 1:1 of $N_2:NH_3$ to approximately 1:10 of $N_2:NH_3$. The nitriding gas mixes inside reactor tube 40 with the aerosol droplets of boron precursor solution 32, leading to a series of reactions which form particles of $BN_xO_yC_z$, the boron nitride precursor intermediate structure as more completely described infra. The particles of $BN_xO_yC_z$ will preferably exhibit spherical shape provided the aerosol droplets are formed and the furnace is heated.

All connection systems 18, 18', 18", 18''' may comprise tubes, connected chambers, pipes, or other delivery mechanisms known in the art. Connection systems may additionally comprise valves for blocking and/or controlling the flow of the carrier gas, as well as check valves to prevent backward flow. Further, connection systems may comprise joints (e.g., elbow joints), connectors (e.g., T-connectors), and affixing means known to the art (e.g., threaded insertion ends, couplings, etc.), as well as multiple flow lines per each system (e.g., when multiple inlets on outlets are used on connected structures). Finally, the connection systems may additionally comprise mechanical or computerized gauge and check systems for monitoring and controlling the flow of gas manually or automatically which may be interconnected with any mechanical or computerized gauge and/or check systems for monitoring and controlling the furnace temperature, gas volume and pressure within the furnace tube.

Flow for both the nitriding gas source and the inert carrier gas source may comprise a wide range of flow rates that are generally at least somewhat dependent on the furnace type used. The furnace used may be a commercial or a bench scale model. An example of a bench scale model furnace that may be used is a Lindbergh Model 54779, fitted with a nominal 4" diameter×6' length reactor tube. A preferred combination range for flow rates of the nitriding gas and carrier gas used for this particular bench scale model furnace, including flow rate, is approximately 0.2 L/min $N_2$+approximately 0.2 L/min $NH_3$ to approximately 2 L/min $N_2$+approximately 6 L/min $NH_3$. Other flow rates may be used as discussed supra, especially on commercial scale model furnaces. In various embodiments, gas mixtures and proportions have $N_2:NH_3$ ratios less than or equal to 1. Ratios of $N_2:NH_3$ greater than 1 typically result in reduced nitriding characteristics. Other reactants that can be utilized as a nitriding source include nitrogen, nitrogen/hydrogen mixtures, alkyl amines, hydrazine, cyanamide, and dicyanamide, hydroxylamine, urea, or mixtures thereof.

In various embodiments, furnace tube 40 will be heated to a temperature of between approximately 600° C. and approximately 1800° C. In various other embodiments furnace tube 40 will be heated to a temperature of between approximately 1200° C. and approximately 1800° C. This causes reactions between the boron containing aerosol droplets and the nitriding gas, forming the intermediate precursor product, $BN_xO_yC_z$, wherein x, y, z are less than or equal to 2.5.

The resultant product may also comprise hydrogen atoms, thereby forming a composition, $BN_xO_yC_zH_q$ (wherein q is greater than or equal to 0), however, for the purposes of this application, such a composition is considered to be within the references to the $BN_xO_yC_z$ composition, therefore all references in the description and claims to the $BN_xO_yC_z$ composition are understood to include $BN_xO_yC_zH_q$ compositions.

Depending upon the reaction conditions utilized in the synthesis, the $BN_xO_yC_z$ powder will have oxygen contents that are approximately 40 wt. % or less, and carbon contents that preferably range from approximately 10 wt. % to approximately 0.2 wt. %. When the bench scale reactor is operated within the preferred variables and conditions, the powder oxygen content can be approximately 15 wt. % or less. In various embodiments, the powder oxygen content can be approximately 15 wt. % to approximately 0.1 wt. %. In various embodiments, the carbon content can be approximately 0.5 wt. % or less.

Scanning electron micrographs (SEM) showing examples of the typical spherical shape of $BN_xO_yC_z$ powders obtained by the methods of the present invention are depicted in FIGS. 5–10 and 14. These were obtained, respectively, from aerosol combinations of $H_3BO_3$/MeOH, $B_2O_3$/MeOH, $NH_4B_5O_8 \cdot 4H_2O$/MeOH and $H_3BO_3$/DMF and were heated at various temperatures from approximately 1000° C. to approximately 1500° C. The examples demonstrate that in this temperature range, oxygen contents vary as described above, with a lower percentage oxygen powder obtained with higher process temperatures (if no significant amount of water is present in the system). In order to avoid significant amounts of water, the original water content of the solvent or boron precursor ("wetness") can be less than approximately 50 wt. %. In various embodiments, the original water content of the solvent or boron precursor will not exceed approximately 10 wt %. It is understood that in both these ranges, that the original water content may vary between no measurable water content (0 wt. %) and the upper ranges listed above. Light agglomeration of the primary particles at the submicron level, giving micron-sized agglomerates of submicron primary particles is demonstrated. Fines may occur as a result of the process or SEM sample preparation. (See, FIGS. 5–10). However, it is not anticipated that the fines interfere with the preferred morphology of the resultant h-BN powders of the invention.

These spherical precursor particles of the present invention are carried by the inert carrier/nitriding gas stream through the furnace where the particles are captured on an impact filter, a bag filter assembly, or other known capturing device 41. The filter unit is opened and the powder is collected through conventional methods well known in the art.

In the event that the boron nitride powders, collected as described above, have higher levels of oxygen and carbon impurities than desired, the collected samples can be inserted into another furnace (not shown) for additional nitriding/calcining. This can be done in an ammonia-rich (or other nitriding agent rich) atmosphere at a furnace temperature of between 600° C. and 1800° C. to form dense BN particles of spherical shape with an B:N ratio of approximately 1:1, and having a hexagonal or turbostratic structure. When formed from $H_3BO_3$/MeOH and $B_2O_3$/MeOH typically, at approximately 1000° C. to approximately 1400° C.), the calcined material tends to produce large macroscopic "blocks" of BN agglomerates or partially sintered BN agglomerates. When formed from $H_3BO_3$/MeOH or $B_2O_3$/MeOH (at above 1400° C.), loose, free-flowing BN is typically obtained. The $BN_xO_yC_z$ products formed from ammonium borates usually show little or no agglomeration at process temperatures from approximately 1000° C. to approximately 1700° C. Loose, free-flowing BN can also be obtained from all samples derived from ammonium borates (regardless of temperature) and $H_3BO_3$/amide systems.

As discussed above, the temperature of the furnace in the AAVS (during the first heating step, stage 1) affects the $BN_xO_yC_z$ powder O and C contents. For example, temperatures below 600° C. produce high O and C contents and irregular particle morphology. At 600° C., spherical powders with O content of, for example, approximately 40 wt. % and C content of approximately 1% (specifically for $H_3BO_3$/MeOH) are typically produced. The oxygen content then dramatically decreases with increasing reactor tube temperature above 600° C. When the reactor atmosphere is richer in $NH_3$, the oxygen content of the $BN_xO_yC_z$ powder also decreases with increasing reactor tube temperature despite the concomitant shorter aerosol residence times. This behavior is closely related to the observations described in U.S. Provisional Patent Application No. 60/286,275, previously incorporated herein by reference.

The flow rate of the gases can also be varied with flow controllers 44, as depicted in FIG. 3, to alter the residence time of the particles in the furnace and/or to change the mole fraction of the primary nitriding gas, $NH_3$, relative to the carrier gas, $N_2$. The flow rates can be either increased or decreased depending on the residence time desired. For example, using $B_2O_3$/MeOH solutions, when the reactor tube temperature is held at 1400° C. and total gas flow rate is set at 4 L/min, as the $NH_3$ mole fraction increases, the weight percent oxygen of the resulting $BN_xO_yC_z$ drops off dramatically from approximately 25% to less than approximately 10%. Similar trends appear with other reactor temperatures. Therefore, a ratio of $N_2$:$NH_3$ less than or equal to 1 is preferred. However, in alternate embodiments, ratios greater than 1 may be utilized in order to make a $BN_xO_yC_z$ having higher oxygen and carbon contents, when desired.

The need for the use of a "second" heating step to further nitride the $BN_xO_yC_z$ powder when a "purer" BN end product is desired is shown by $BN_xO_yC_z$ powder characterization using bulk elemental analysis, X-ray diffraction (XRD) and scanning electron microscopy (SEM). These data confirm that the Stage 1 (after the first heating step) AAVS runs produce spherical morphology $BN_xO_yC_z$ powders that have a low degree of crystalline order or are turbostratic.

The time and temperature of additional nitridation/calcination and post-nitriding determine the residual oxygen and carbon contents and, consequently, the final degree of crystallinity of the BN product. However, it has been further discovered in accordance with the present invention that the nitridation/calcination time and temperature are inversely proportional. Accordingly, the heat treatment time may be shortened by proportionally raising the nitridation/calcination temperature. The heat treatment step may or may not change the surface features on the spherical morphology on the BN particles, depending on the nitridation/calcination conditions. It is also possible to skip the collection of intermediate $BN_xO_yC_z$ powder and feed the initially produced gas stream containing $BN_xO_yC_z$ powder into a second, separately heated reactor where final nitridation takes place. Finally, it is also possible to use a vertical furnace configuration (with or without counter current gas/aerosol flow) or other modified reactor designs thereby extending the aerosol residence time in the reactor so that spherical morphology or related morphologies are obtained in a single stage, with low oxygen and carbon contents, without second stage calcination, to give hexagonal or turbostratic BN. It is possible to perform such a "one-step' reaction in a horizontal furnace as depicted in FIG. 3, however, it is anticipated that the yield will render greater impurities, wherein "impurities" are viewed as BN structures not having a spheroidal structure or additional elements other than boron or nitrogen.

Therefore, in order to remove the remaining O and C impurities and increase the powder crystallinity, the $BN_xO_yC_z$ powders can be nitrided further under $NH_3$, as shown in the following generalized reaction:

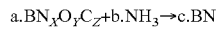

where a, b, and c are >0; x, y, and z are ≧0; and additional volatile products, for example $CO_2$ and CO, may result.

In various embodiments, the $BN_xO_yC_z$ powders are collected from the tube furnace and placed in a second furnace (or the powder is not collected and the powder entrained on a gas stream is simply vented to the second furnace), or are subjected to an additional run in the original furnace. (See Example 1, infra.) Additional carbon can be added to assist with the O replacement via carbothermal reduction, if desired. This carbon addition may be accomplished, for example, by use of higher molecular weight R groups for the non-aqueous, alcohol compounds in the precursor solvent, thereby increasing the relative proportion of the non-aqueous solvent in the solution by addition of alkane, amine, or arene compounds in the aerosol feed stream, or by addition of carbon powder to the $BN_xO_yC_z$ powder.

The nitriding conditions of this method may be varied in order to obtain dense or hollow particles that have morphologies that include but are not limited to smooth spherical particles that have a turbostratic structure, "textured" or bladed surface roughened spherical particles, "fuzzy" spherical particles having crystalline whisker growth on the primary particle surfaces, "bladed" spherical morphology particles where the blades are highly ordered h-BN or fully platelet morphology particles that have the h-BN crystal structure. Variations in aerosol precursor, aerosol generation, aerosol processing, and reactor conditions (Stage I) and subsequent powder nitridation (Stage II) allow for the formation of these various products.

Additionally, the nitridation conditions may also be varied in order to affect final powder density, surface area and microporosity. The amount of carbon in the $BN_xO_yC_z$ can be conveniently varied by use of higher molecular weight R groups for the non-aqueous solvent, thereby increasing the relative proportion of the non-aqueous solvent in the solution by addition of alkane, amine, or arene compounds in the aerosol feed stream, as well by nitridation conditions in Stage I. The resulting nano-dispensed carbon can be involved in carbothermal reduction/nitridation stage reactions with ammonia (Stage II) providing microporous or nanoporous powder particles with variable surface areas (e.g., 500–1500 m²/g) and porosities, including hollow and dense particles.

Further, the addition of s-, p-, and d-block elements are known to affect the crystallization of BN. In this process, metals (designated as M, wherein a≧0.001) in the form of soluble salts such as nitrates and acetates are added to the non-aqueous solvent and subsequent aerosol processing gives $BN_xO_yC_zM_a$ powders. This includes, but is not limited to Li, Mg, Ca, and Cu salts. Additionally, metal halides, such as but not limited to those formed with Cl, Br, and I may be used. Subsequent calcining under a nitriding atmosphere promotes growth of platelets and fibrils and whiskers on the primary BN particle surfaces.

Nitride forming metals also may be added as soluble salts to the aerosol forming solution and subsequent processing gives $BN_xO_yC_zM'_b$ compositions (wherein M' designates a metal, and b≧0.001). This includes, but is not limited to Al, Ga, Ti, Zr, Li, Mg, Ca, Mn, Sc, V, Cr, Fe, and Co. Subsequent calcining under nitriding atmospheres gives composite nitrides $BN/(M'_cN)_d$ wherein M' designates a metal, and wherein preferably, c≧0.05 and more preferably c≦3.0, and wherein preferably d≧0.001.

According to various embodiments, spherical shaped $BN_xO_yC_z$ particles can be formed by dissolving boric acid in a liquid amide reagent, including but not limited to N,N-dimethylformamide (DMF) and formamide to form a solution. A concentration of boric acid in the solution can be, for example, 20 wt % or less. As disclosed herein, an aerosol can be formed from the solution and a gas stream can be used to carry the aerosolized solution into a furnace. $BN_xO_yC_z$ particles can then be formed by injecting a gaseous nitriding agent into the furnace. The gaseous nitriding agent can be one or more of $NH_3$, $NH_2$, hydrazine, cyanamide, dicyanamide, mixtures of ammonia and hydrogen, mixtures of ammonia, argon, and hydrogen and mixtures of nitrogen and hydrogen. The furnace temperature can be about 1000° to about 1500°. In various embodiments, h-BN particles can then be formed by heat treating the $BN_xO_yC_z$ particles in an atmosphere comprising the gaseous nitriding agent.

The $BN_xO_yC_z$ particles formed by the disclosed method can be spherical in shape. The particles can further be characterized by an average diameter of about 1 to about 10 microns and by a surface area of 200 m²/g or more. In various embodiments, the surface area can be 1000 m²/g or more. In various other embodiments, the surface area can be 1500 m²/g or more. According to various embodiments, the $BN_xO_yC_z$ particles formed by the disclosed method can be dense and/or hollow.

The following examples describe application of the preferred methods of the present invention and these are given for illustration purposes only. None of the parameters of the examples used are intended to further limit the specifications or claims in any fashion.

EXAMPLE 1

Boric acid ($H_3BO_3$) (30.92 g, 0.5 mol) was mixed with methanol ($CH_3OH$) (162 ml, 4.0 mol). The mixture was stirred for several hours until clear (the MeOH solution can be warmed to accelerate dissolution, if necessary). The solution was transferred to a storage container attached to an aerosol generation vessel such as shown in FIG. 4, and was then added (in batches) to the aerosol generation vessel to provide continuous aerosol mist after activation of the aerosol transducer (some amount of methyl ester may form in this process). Approximately 20–25 mL of $H_3BO_3$/MeOH solution was converted to aerosol mist per hour under these conditions. Mist was swept into the AAVRS tube by a stream of nitrogen gas (0.5 L/min) where it was mixed with $NH_3$ vapor (3.5 L/min), added separately. The resulting aerosol vapor stream (liquid volume of ~20–25 mL/hr) was carried through the reactor in the $N_2/NH_3$ gas mixture. The reactor temperature was held at 1000° C. The resulting $BN_XO_YC_Z$ powder was collected on an impact filter at the distal end of the reactor, comprising a yield of 4.9 g of off-white powder in 4 hours. Chemical analysis was C=9.9%; H=4.7%; N=39.3%; O=21.9%; B=17.2%. Subsequent heating of this material at 1600° C. (4 h) under $NH_3$ (0.2 L/min) gave a white powder having a chemical analysis of C=1.0%; H=0.6%, N=53.4%; O=1.4%; B=42.8%, and a BN ceramic yield of 80% in the second pyrolysis step.

EXAMPLE 2

$BN_xO_yC_z$ powder was prepared as described in Example 1 with the exception that the reactor temperature was set at 1400° C. Off-white powder (2.5 g) was collected on an impact filter with a chemical analysis of C=2.5%; H=1.3%; N=37.2%; O=21.5%; B=36.8%. Subsequent heating of this material at 1600° C. (4 h) under $NH_3$ (0.2 L/min) gave a white powder having a chemical analysis of C=0.4%; H=02%; N=52.9%; O=1.6%; B=42.7%. The ceramic yield of BN was 80% in the second pyrolysis step.

EXAMPLE 3

Crystalline boric oxide ($B_2O_3$) (34.81 g, 0.5 mol) was placed in a 250 mL flask with a stir bar and filled with a septum-covered side arm, a reflux condenser, and a nitrogen gas purge inlet. Methanol ($CH_3OH$) (162 mL, 4.0 mol) was slowly added in small portions from an air tight syringe connected to the flask through the side arm septum. An exothermic reaction resulted. The $CH_3OH$ addition was varied to evenly control the solution reflux. The mixture was stirred vigorously throughout the addition in order to avoid clumping of the $B_2O_3$ reagent. This solution ($B_2O_3/CH_3OH$ ratio of 1:8) was close to the saturation limit of the solution, so a small amount of extra $CH_3OH$ may need to be added to insure that no solid reforms during the aerosol mist generation. The solution was transferred to a storage container attached to the aerosol generation vessel such as shown in FIG. 4 and added (in batches) to the aerosol generation vessel to provide continuous aerosol mist generation after activation of the transducer (methyl ester may form). Mist was swept into the AAVRS tube by a stream of nitrogen gas (0.5 L/min) where it was mixed with ammonia ($NH_3$, 3.5 L/min), added separately. The aerosol vapor (liquid volume of approximately 20–25 mL/h) was carried through the reactor in the $N_2/NH_3$ gas mixture with the reactor temperature set at 1400° C. The resulting $BN_xO_yC_z$ powder was collected on an impact filter at the distal end of the reactor, yielding 0.8 g of off-white powder in 1 hour, and having a chemical analysis showing an oxygen content of 10.3%. Subsequent heating at 1600° C. (4 h) under $NH_3$ (0.2 L/min) gave a white powder with an oxygen content of 0.8%, and a BN ceramic yield of 79%.

EXAMPLE 4

$BN_xO_yC_z$ powder was prepared as described in Example 3 except using a solution containing $B_2O_3$ (24.37 g, 0.35 mol) and $CH_3OH$ ratio of 1:12 and a reactor tube temperature of 1000° C. About 130–140 mL of solution was used. The resulting $BN_xO_yC_z$ powder (7.5 g collected in 4 h) was light gray and displayed a chemical analysis C=9.8%; H=4.1%; N=40.0%; C=19.8%; B=18.5%. Subsequent heating at 1600° C. (4 h) under $NH_3$ (0.2 L/min) gave a white powder with an analysis of C<0.2%; H<0.2%; N=56.4%; O=1.3%; B=43.4%, and a BN ceramic yield of 80%.

EXAMPLE 5

$BN_xO_yC_z$ powder was prepared as described in Example 4 except using a reactor temperature of 1400° C. About 100–120 mL of solution was used. The resulting $BN_xO_yC_z$ powder (5.1 g collected in 4 h) was off-white and displayed a chemical analysis of C=0.5%; H=0.5%; N=44.8%; O=12.4%; B=40.0%. Subsequent heating at 1600° C. (4 h) under $NH_3$ (0.2 L/min) gave a white powder with a chemical analysis of C<0.1%; H=0.2%; N=54.2%; O=1.0%; B=44.2%, and a BN ceramic yield of 71%.

EXAMPLE 6

Crystalline ammonium pentaborate tetrahydrate $NH_4B_5O_8 \cdot 4H_2O$ (20.00 g or 0.073 mol), was dissolved in 150 mL of methanol affording an approximately 0.5M solution. The solution was transferred to a storage container attached to the aerosol generation vessel such as shown in FIG. 4 and added (in batches, about 140 mL of the solution was used) to the aerosol generation vessel to provide continuous aerosol mist generation after activation of the transducer. Mist was swept into the AAVRS tube by a stream of nitrogen gas (1.0 L/min) where it was mixed with ammonia (3.0 L/min), added separately. The aerosol medium was carried through the reactor in the $N_2/NH_3$ gas mixture with the reactor temperature set at 1400° C. The resulting $BN_xO_yC_z$ powder was collected on an impact filter at the distal end of the reactor, yielding 2.22 g of a very light gray powder after 3 hours. The powder displayed an oxygen content of 24.8%. Subsequent heating of the sample at 1600° C. (for 4 hours) under nitriding conditions ($NH_3$ at 0.2 L/min) yielded a white powder with an oxygen content of 1.4% and a BN ceramic yield of 78%.

EXAMPLE 7

$BN_xO_yC_z$ powder was prepared as described in Example 6, except a reactor temperature of 1500° C. was used. The resulting $BN_xO_yC_z$ powder was a very light gray and had an oxygen content of 29.0%. The powder was collected after 3 hours, yielding 2.46 g. Subsequent heating of the sample at 1600° C. (for 4 hours) under nitriding conditions ($NH_3$ at 0.2 L/min) yielded a white powder with an oxygen content of 2.1% and a BN ceramic yield of 77%.

EXAMPLE 8

$BN_xO_yC_z$ powder was prepared as in Example 2 except that N,N-dimethyl formamide was employed as the solvent. A solution containing $H_3BO_3$ (20 g, 0.3 mol) in DMF (100 mL) was prepared and approximately 4–6 mL of solution was converted into aerosol mist per hour, The mist was injected into the reactor (1400° C.) in a stream of nitrogen (0.5 L/min) and ammonia (0.5 L/min) was injected separately. The resulting $BN_xO_yC_z$ powder (0.1 g/hr) was off-white. Subsequent heating (1500° C.) under ammonia gave a very fluffy, high surface area (1380 $m^2/g$) white powder.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A plurality of hollow spherical particles comprising $BN_xO_yC_z$, the hollow spherical particles being characterized by an average diameter of about 0.1 to about 10 microns and by a surface area of about 200 $m^2/g$ or more, and wherein x>0, y>0, and z>0.

2. The plurality of hollow spherical particles of claim 1, wherein the hollow spherical particles are characterized by a surface area of about 1000 $m^2/g$ or more.

3. The plurality of hollow spherical particles of claim 1, wherein the hollow spherical particles are characterized by a surface area about 200 m$^2$/g to about 1500 m/g.

4. The plurality of hollow spherical particles of claim 1, wherein the plurality of hollow spherical particles have an oxygen content of 15wt % or less.

5. The plurality of hollow spherical particles of claim 1, wherein the plurality of hollow spherical particles have a carbon content of 0.5wt % or less.

6. The plurality of hollow spherical particles of claim 1, wherein the plurality of hollow spherical particles are formed by the steps comprising:

dissolving boric acid in one member selected from the group consisting of N,N-dimethylformamide (DMF) and formamide to form a solution, wherein the solution comprises 20wt % or less of boric acid;

forming an aerosol from the solution;

using a gas stream to carry the aerosolized solution into a furnace; and forming hollow $BN_xO_yC_z$ particles by injecting a gaseous nitriding agent into the furnace.

7. A plurality of hollow hexagonal crystal structure boron nitride particles (h-BN), the hollow hexagonal crystal structure boron nitride particles being characterized by an average diameter of about 1 to 10 microns and by a surface area of about 200 m$^2$/g or more.

8. The plurality of hollow hexagonal crystal structure boron nitride particles of claim 7, wherein the surface area is about 1000 m$^2$/g or more.

9. The plurality of hollow hexagonal crystal structure boron nitride particles of claim 7, wherein the surface area is about 200 m$^2$/g to about 1500 m$^2$/g.

10. The plurality of hollow hexagonal crystal structure boron nitride particles of claim 7, wherein the plurality of hollow hexagonal crystal structure boron nitride particles are formed by the steps comprising:

dissolving boric acid in one member selected from the group consisting of N,N-dimethylformamide (DMF) and formamide to form a solution, wherein the solution comprises 20wt % or less of boric acid;

forming an aerosol from the solution;

using a gas stream to carry the aerosolized solution into a furnace; forming $BN_xO_yC_z$ particles by injecting a gaseous nitriding agent into the furnace; and forming the plurality of hollow h-BN particles by heat treating the $BN_xO_yC_z$ particles in an atmosphere comprising the gaseous nitriding agent.

\* \* \* \* \*